(12) United States Patent
Yasui et al.

(10) Patent No.: US 8,297,047 B2
(45) Date of Patent: *Oct. 30, 2012

(54) EXHAUST GAS PURIFYING APPARATUS FOR INTERNAL COMBUSTION ENGINE

(75) Inventors: Yuji Yasui, Wako (JP); Koichi Nakajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 132 days.

This patent is subject to a terminal disclaimer.

(21) Appl. No.: 12/600,401

(22) PCT Filed: Jan. 19, 2009

(86) PCT No.: PCT/JP2009/050609
§ 371 (c)(1),
(2), (4) Date: Aug. 23, 2010

(87) PCT Pub. No.: WO2009/096246
PCT Pub. Date: Aug. 6, 2009

(65) Prior Publication Data
US 2011/0232263 A1    Sep. 29, 2011

(30) Foreign Application Priority Data
Jan. 29, 2008 (JP) .................. 2008-17010

(51) Int. Cl.
*F01N 3/18* (2006.01)
*F02D 28/00* (2006.01)
(52) U.S. Cl. .......................... 60/301; 60/295
(58) Field of Classification Search ........ 60/295
See application file for complete search history.

(56) References Cited

U.S. PATENT DOCUMENTS

| 6,829,890 | B2 * | 12/2004 | Gui et al. ................. 60/295 |
| 7,792,631 | B2 * | 9/2010 | Bottcher et al. .......... 701/108 |
| 8,116,967 | B2 * | 2/2012 | Bottcher et al. .......... 701/115 |
| 2001/0015066 | A1 * | 8/2001 | Takaku et al. ............ 60/285 |
| 2007/0174222 | A1 * | 7/2007 | Daneau et al. ............ 706/19 |
| 2007/0233623 | A1 * | 10/2007 | Vatchkov et al. ......... 706/19 |

FOREIGN PATENT DOCUMENTS

| JP | 2003-328732 A | 11/2003 |
| JP | 2005-48642 | 2/2005 |
| JP | 2006-214322 A | 8/2006 |
| JP | 2006-237958 | 9/2006 |

* cited by examiner

*Primary Examiner* — Kenneth Bomberg
*Assistant Examiner* — Brandon Lee
(74) *Attorney, Agent, or Firm* — Arent Fox LLP

(57) ABSTRACT

An exhaust gas purifying apparatus for an internal combustion engine having a lean NOx catalyst in an exhaust system is provided. The lean NOx catalyst traps NOx in exhaust gases when the exhaust gases are in an oxidizing state, and discharges the trapped NOx when the exhaust gases are in an reducing state. In this apparatus, an estimated trapped NOx amount which is an estimated value of an amount of NOx trapped in the lean NOx catalyst, is calculated using a neural network. Engine operating parameters indicative of an operating condition of the engine are input, and the neural network outputs at least one control parameter which is relevant to the lean NOx catalyst. A reducing process of the NOx trapped in the lean NOx catalyst is performed according to the estimated trapped NOx amount.

1 Claim, 23 Drawing Sheets

[FIG. 1]
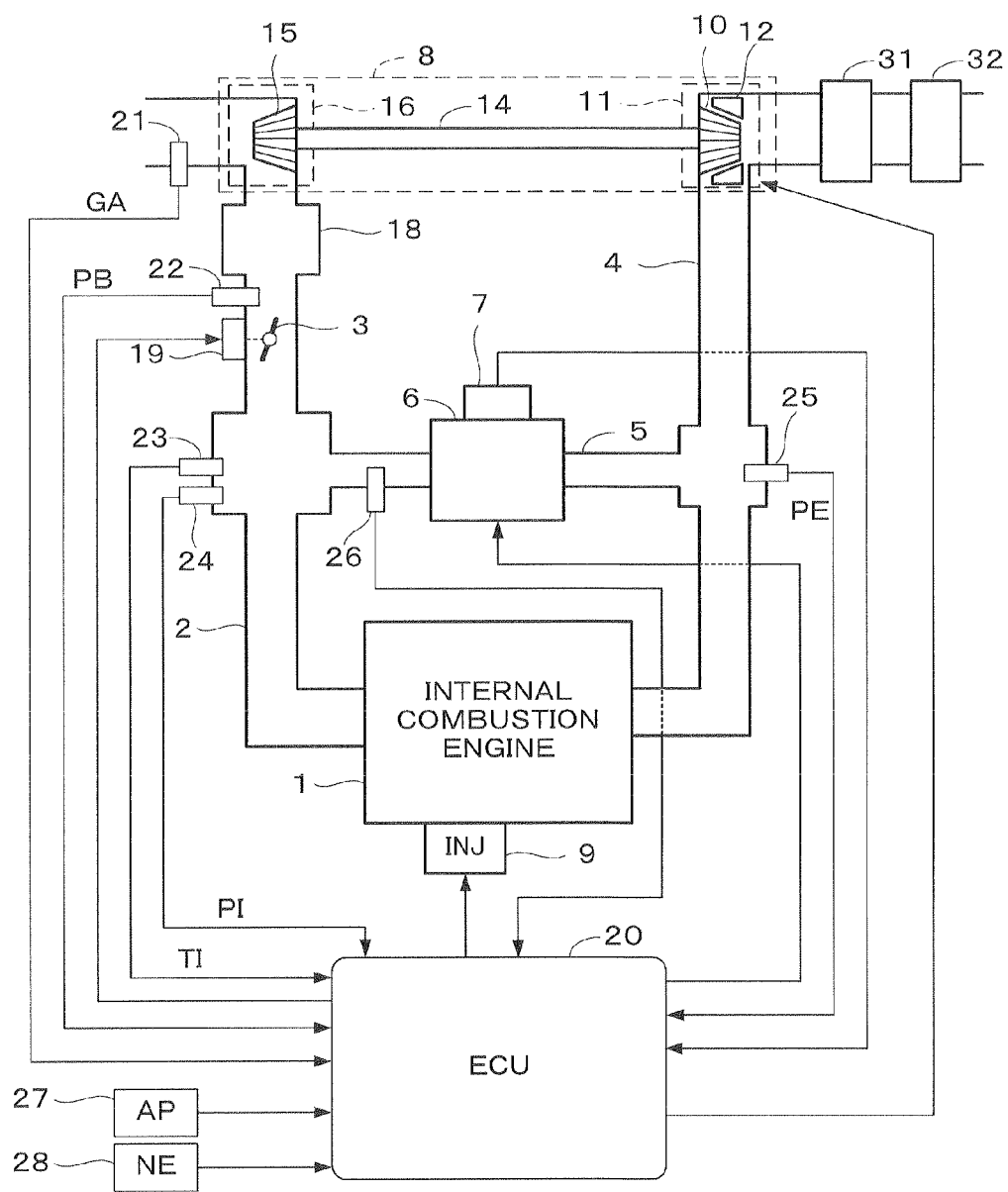

[FIG. 2]
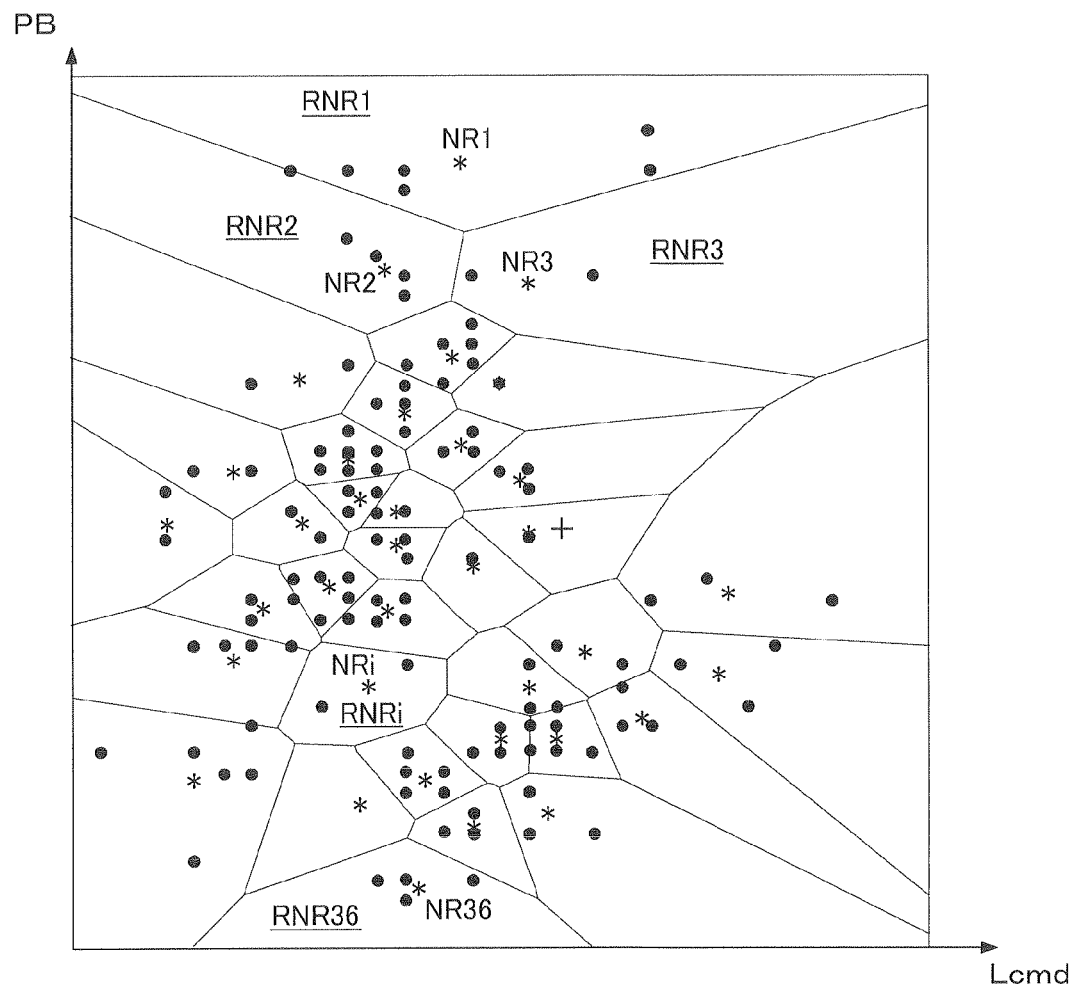

[FIG. 3]
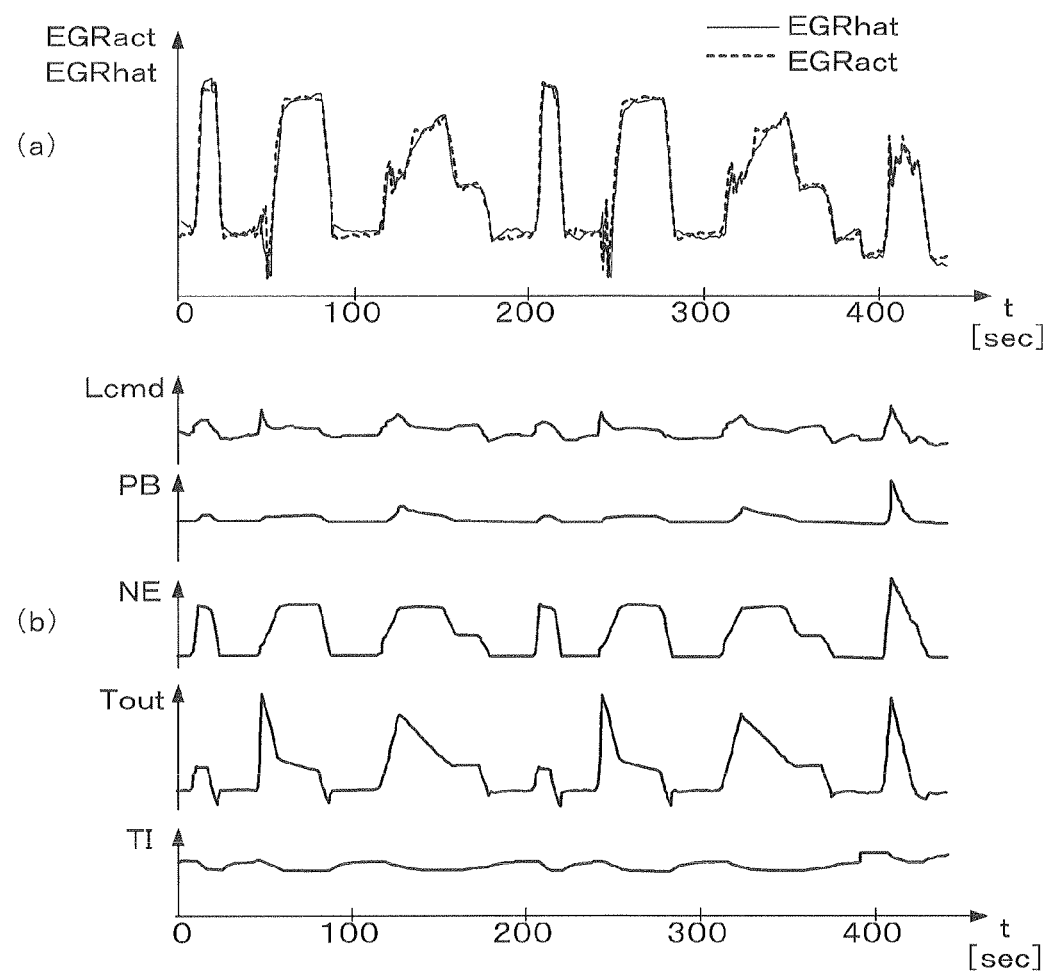

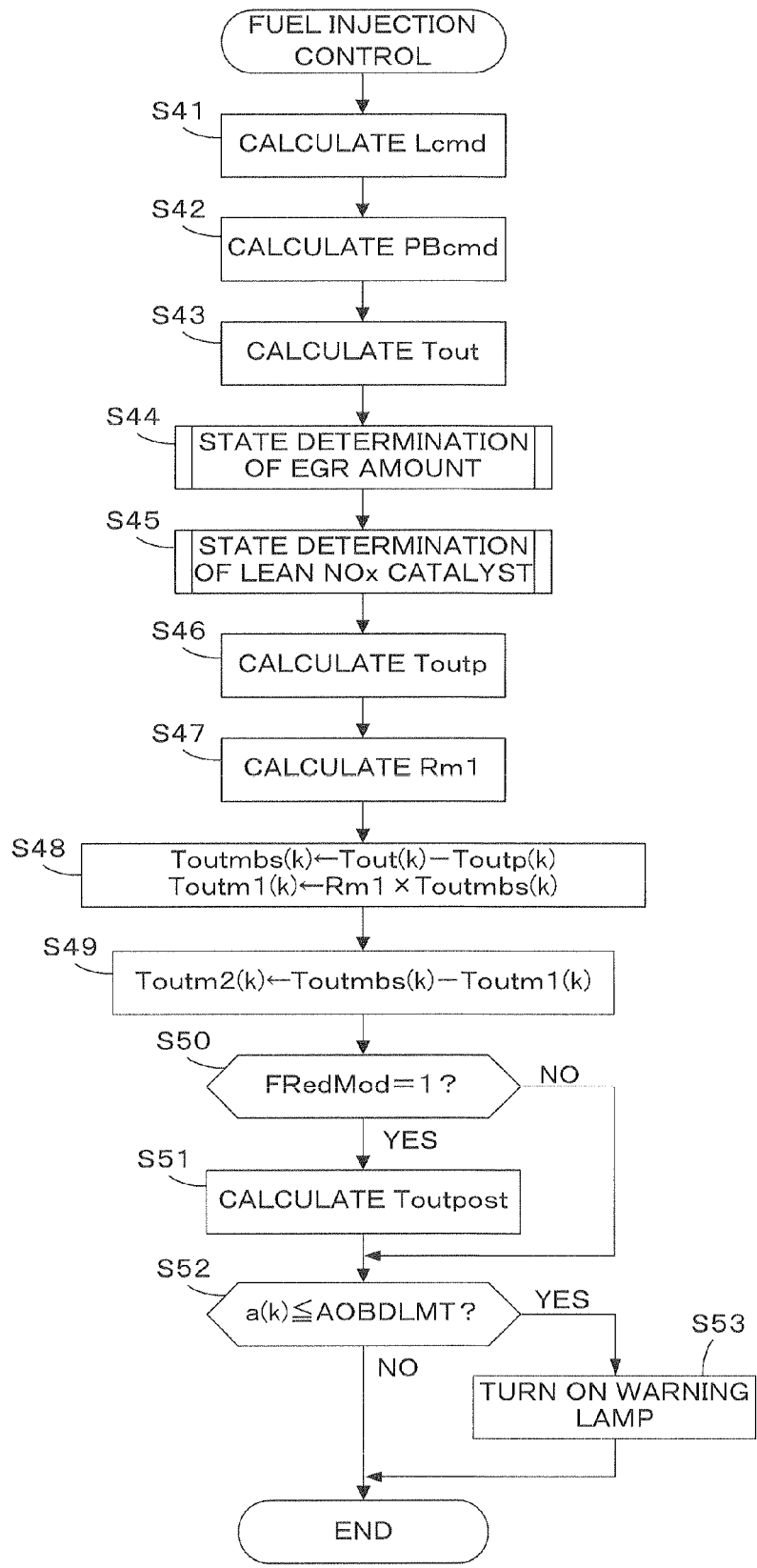
[FIG. 4]

[FIG. 5]
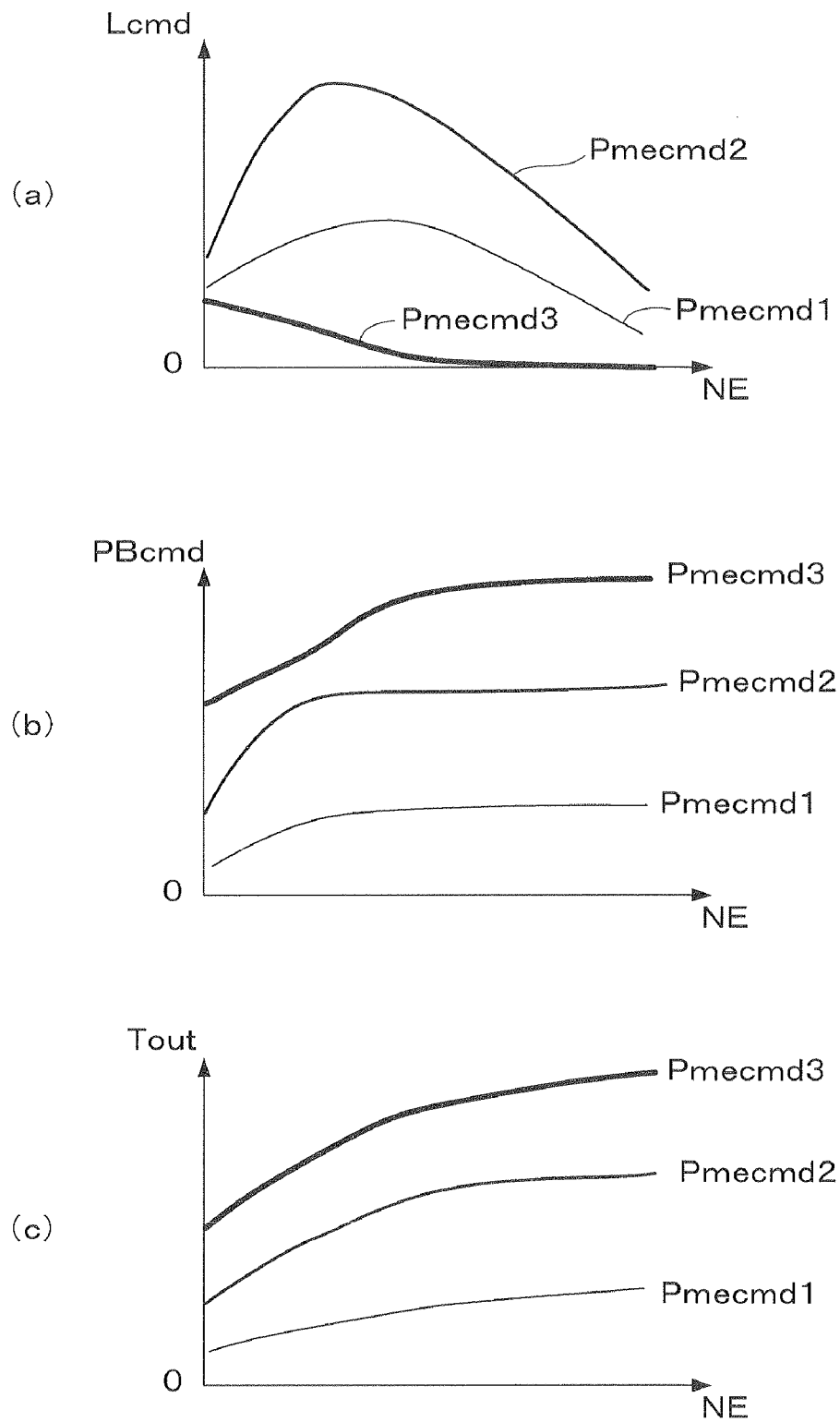

[FIG. 6]
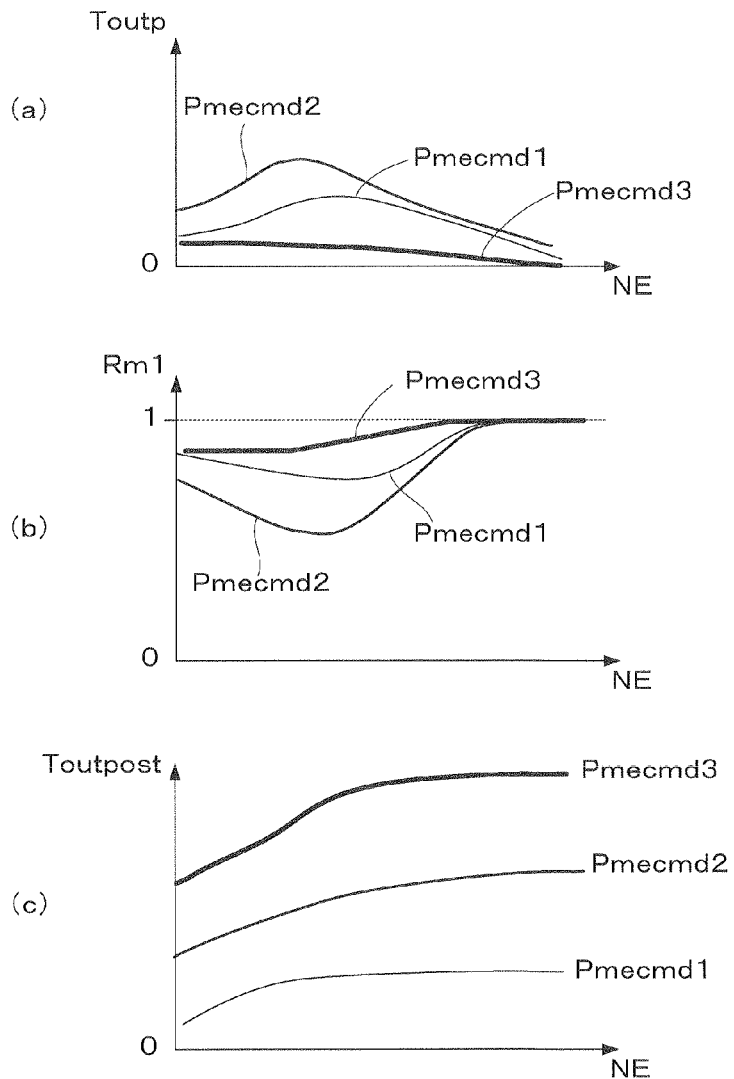
[FIG. 7]
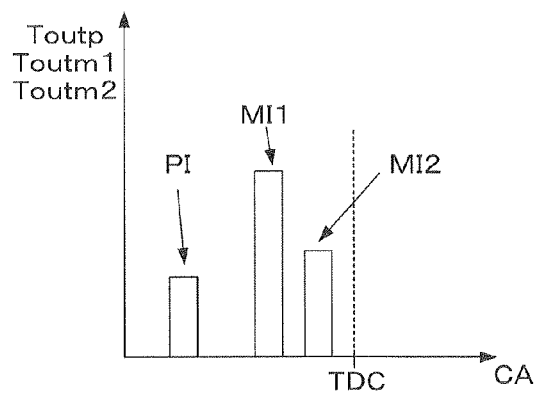

[FIG. 8]
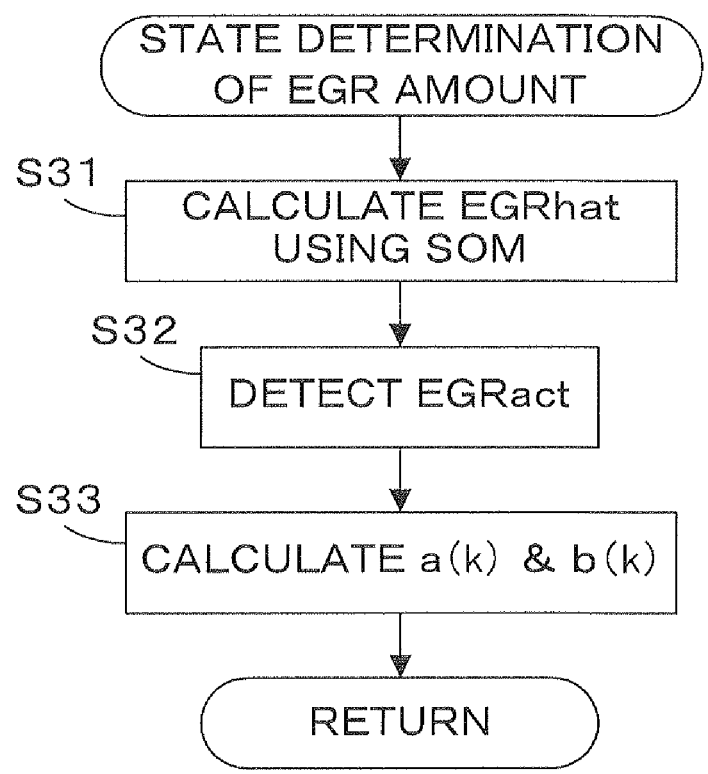

[FIG. 9]
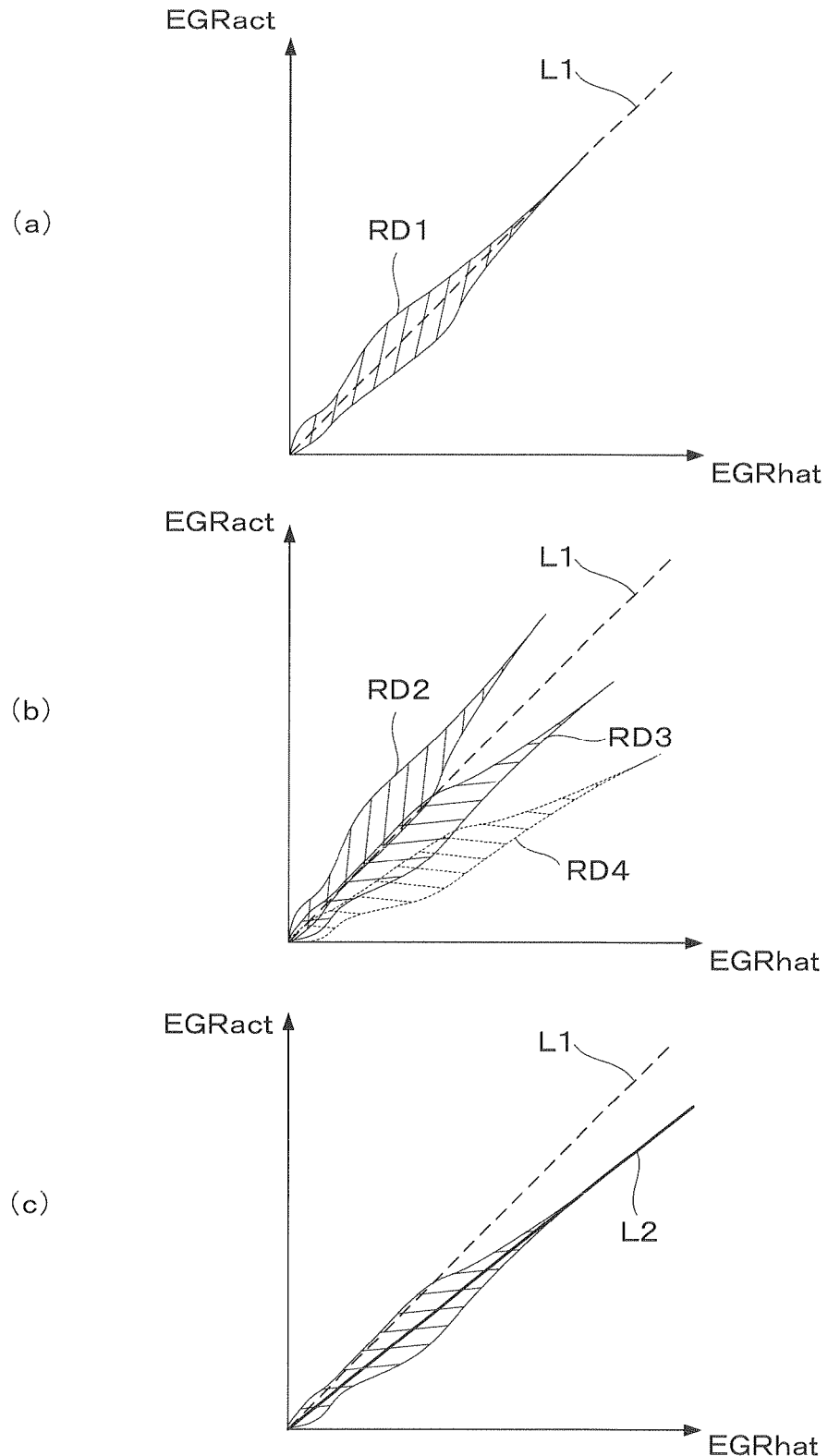

[FIG. 10]
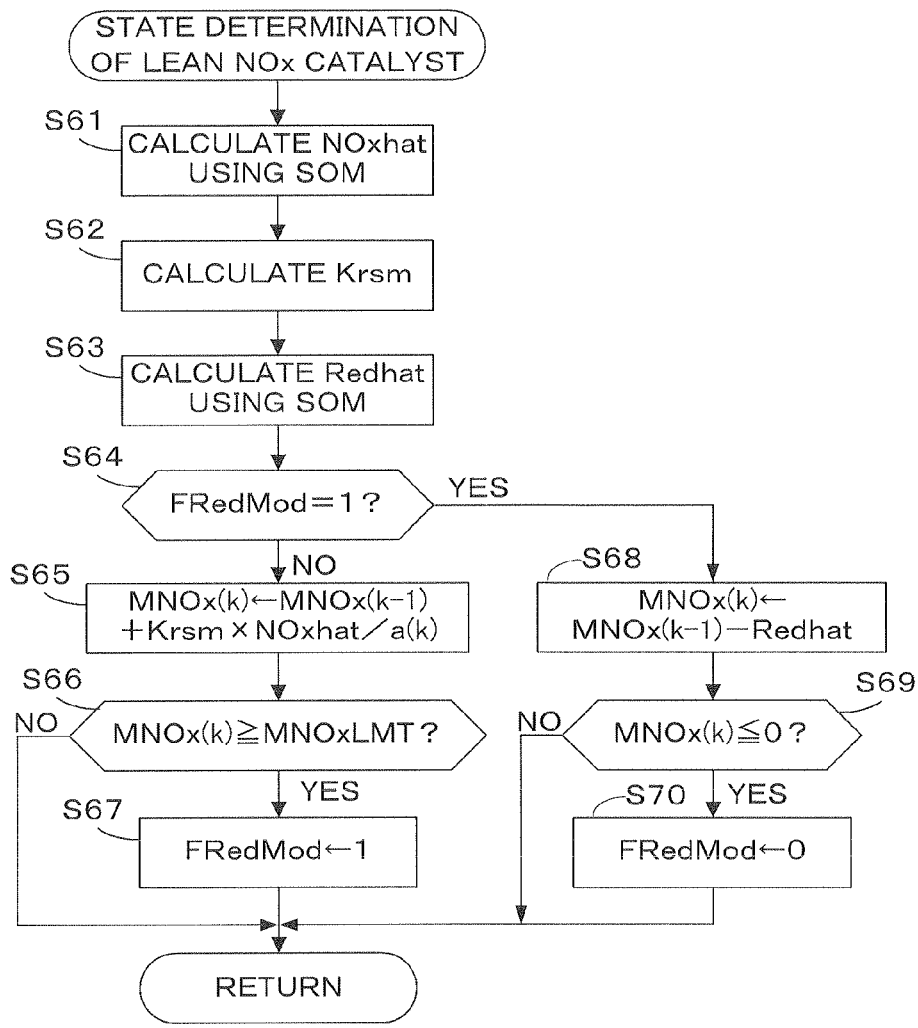
[FIG. 11]
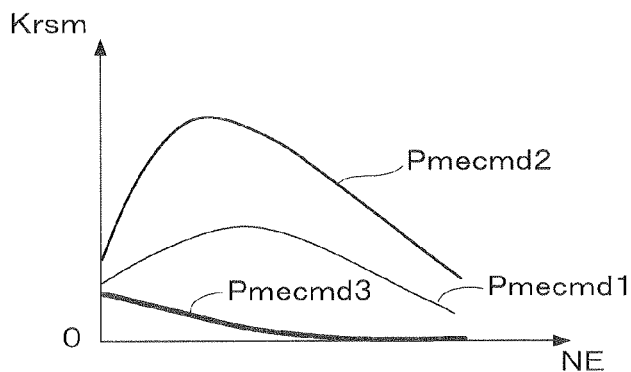

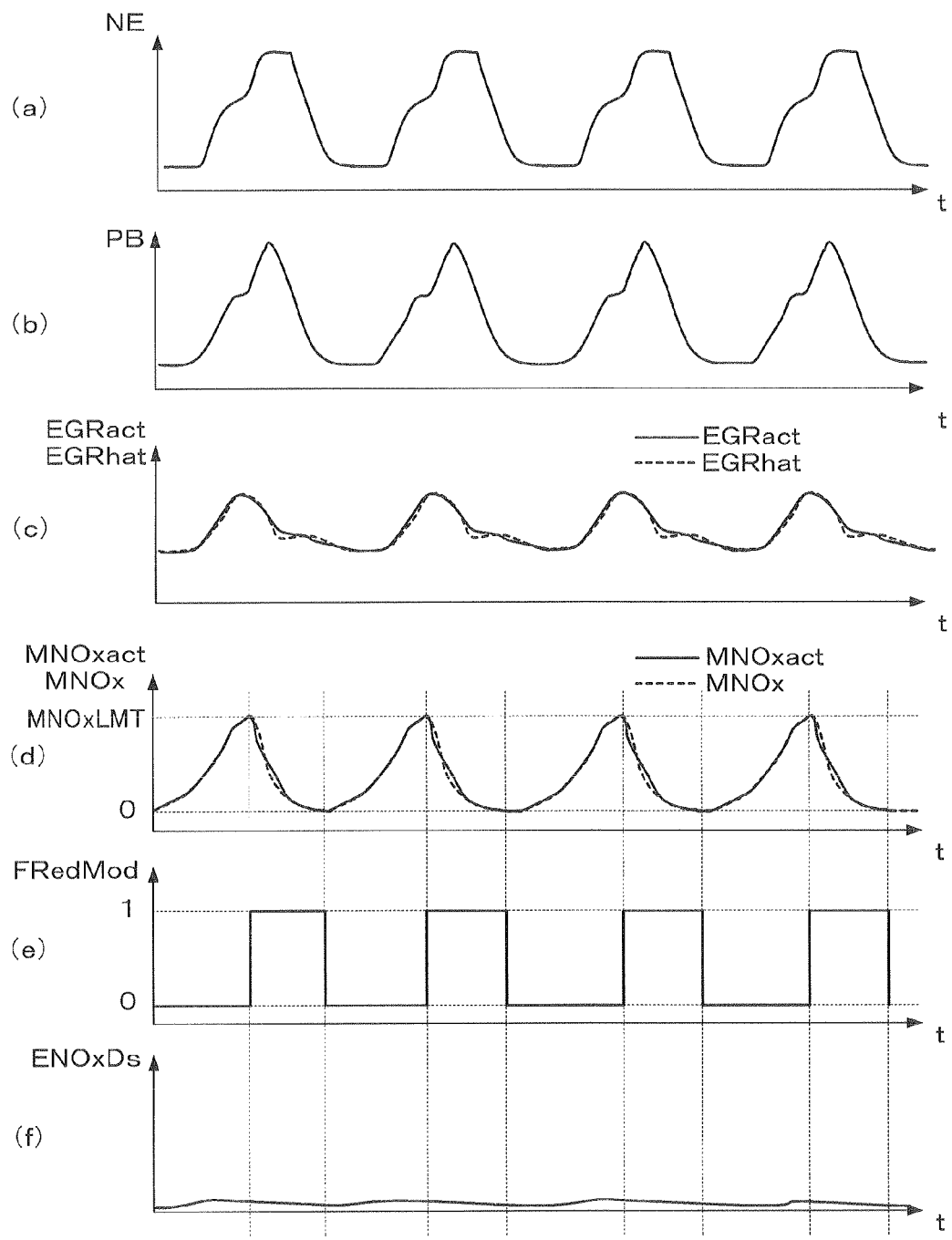
[FIG. 12]

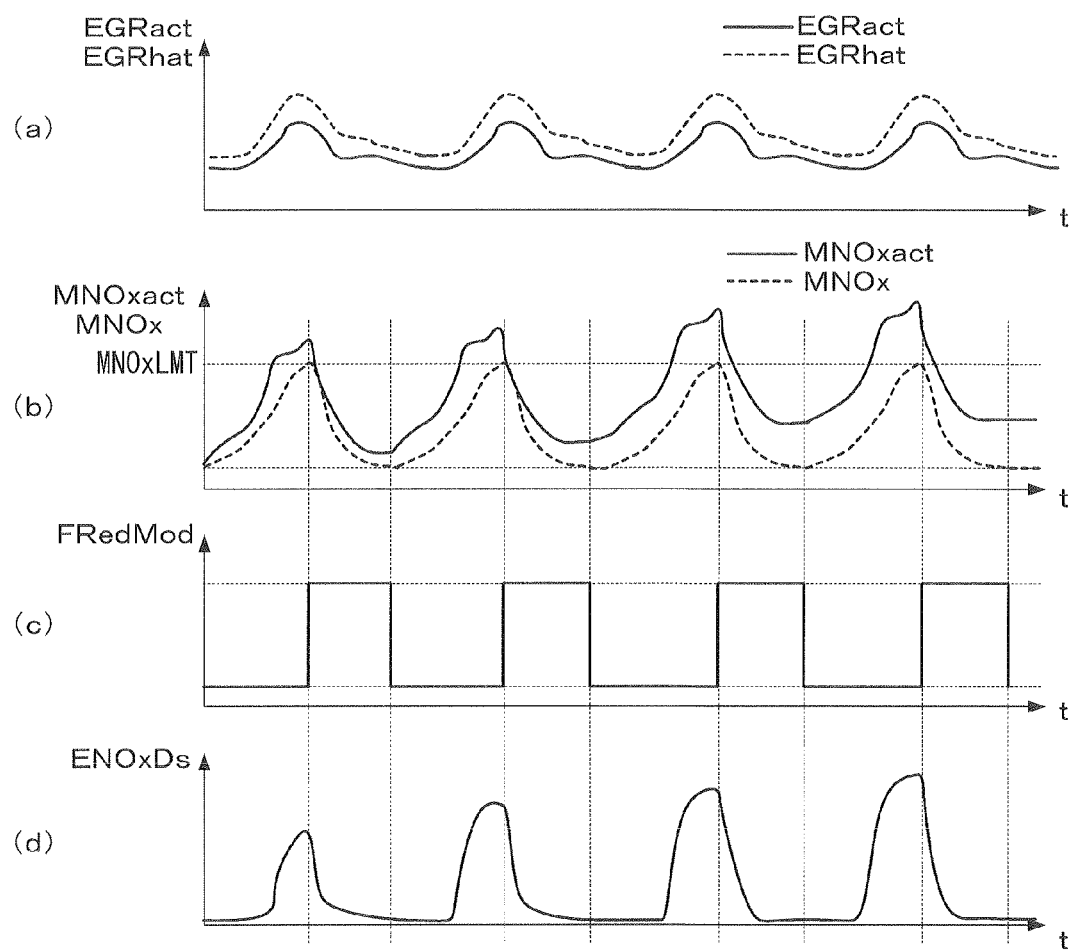
[FIG. 13]

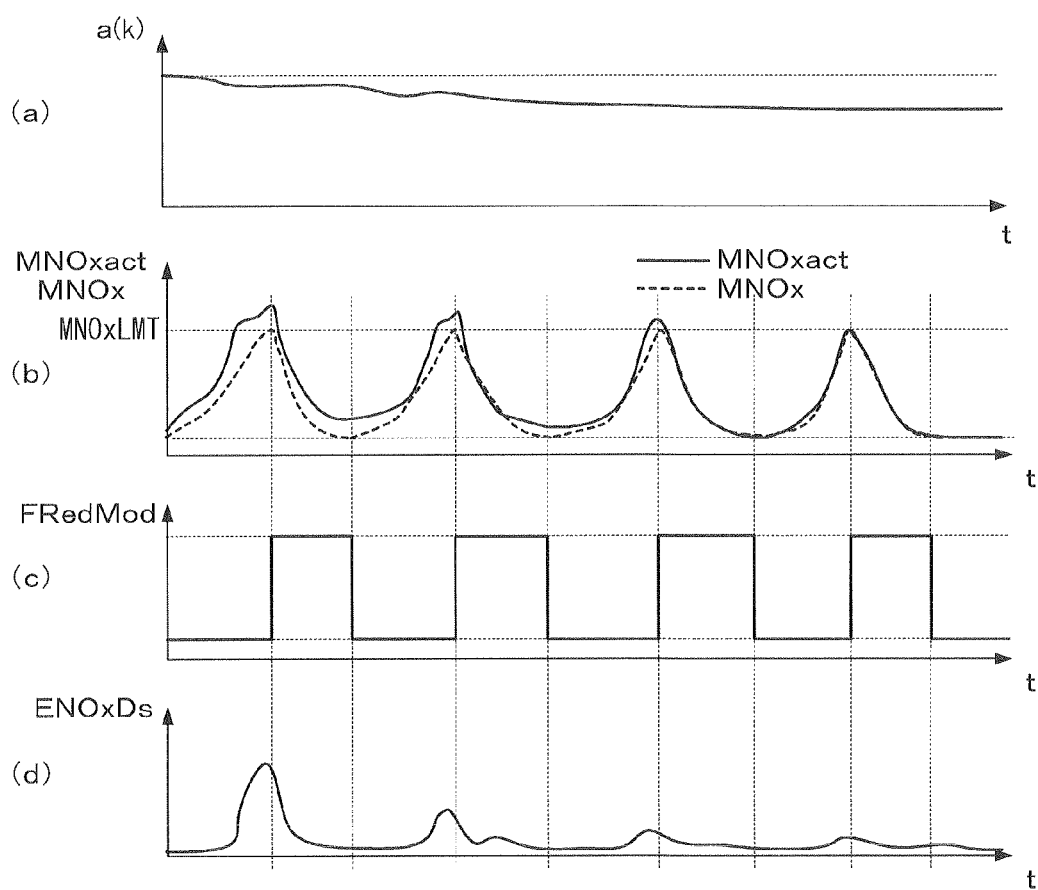

[FIG. 15]
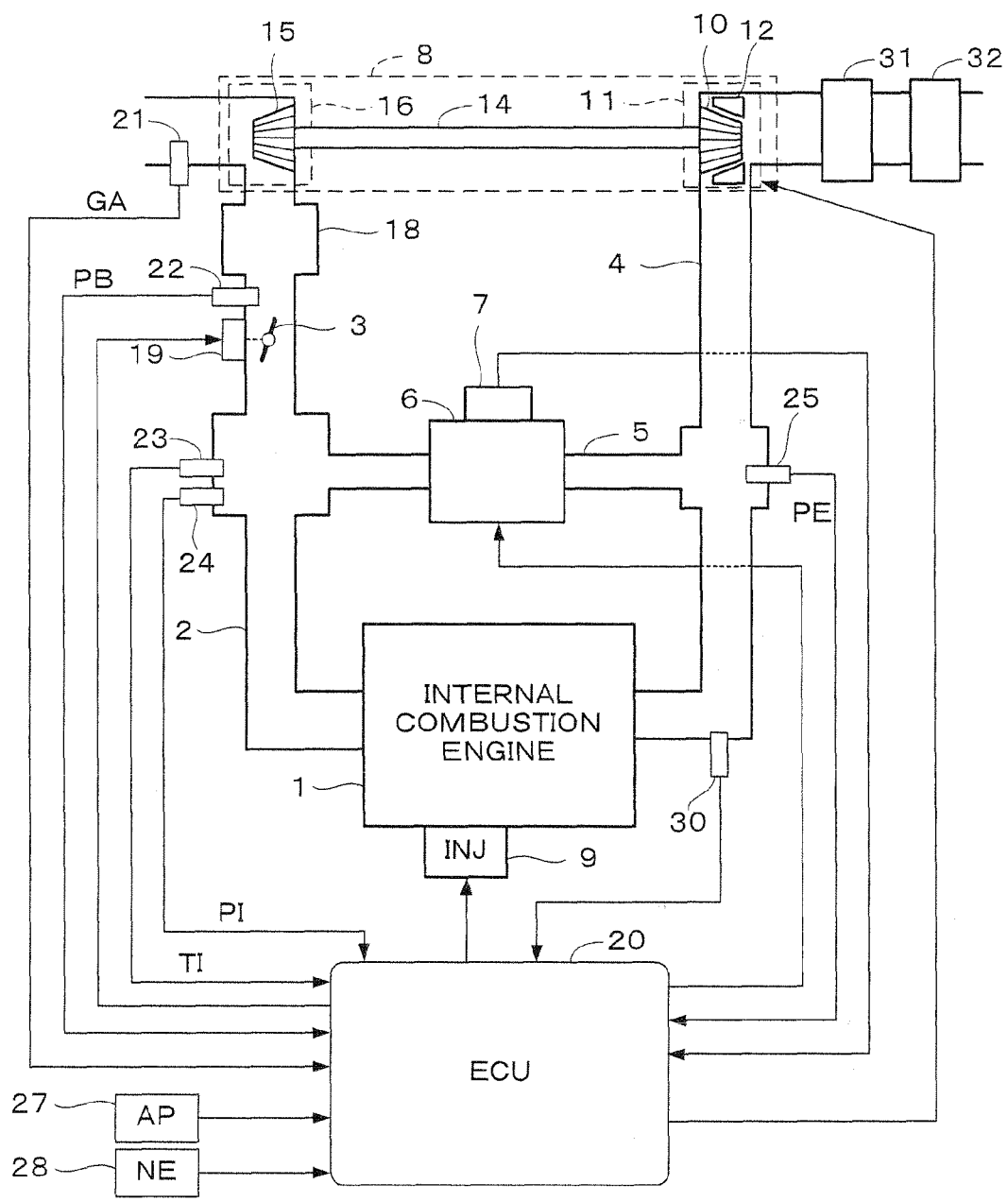

[FIG. 16]
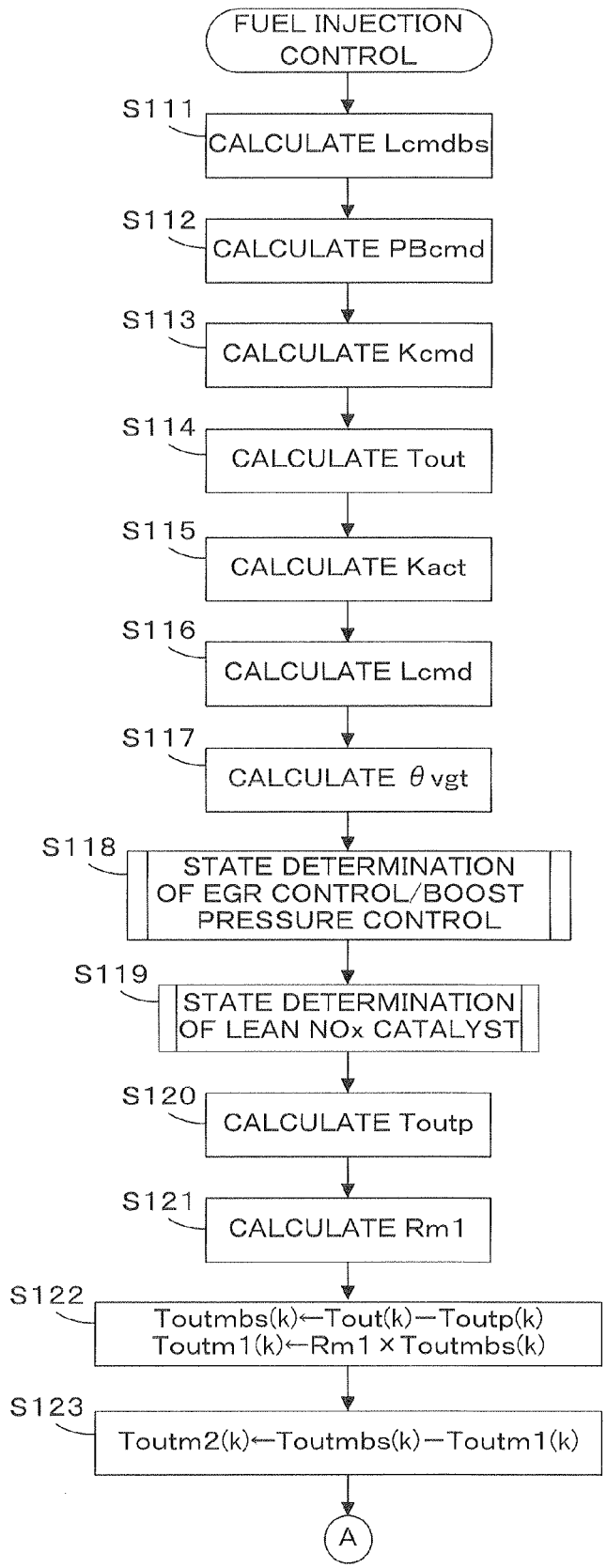

[FIG. 17]
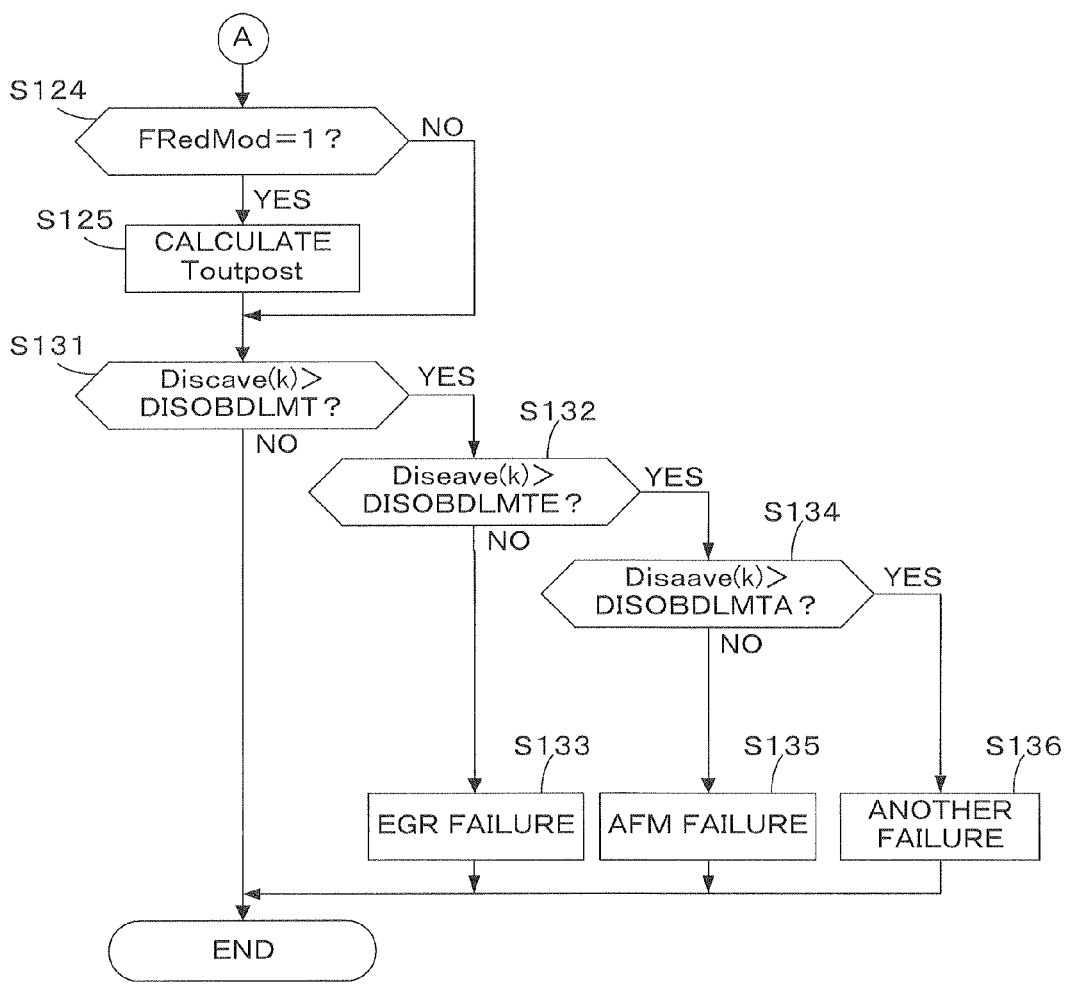

[FIG. 18]
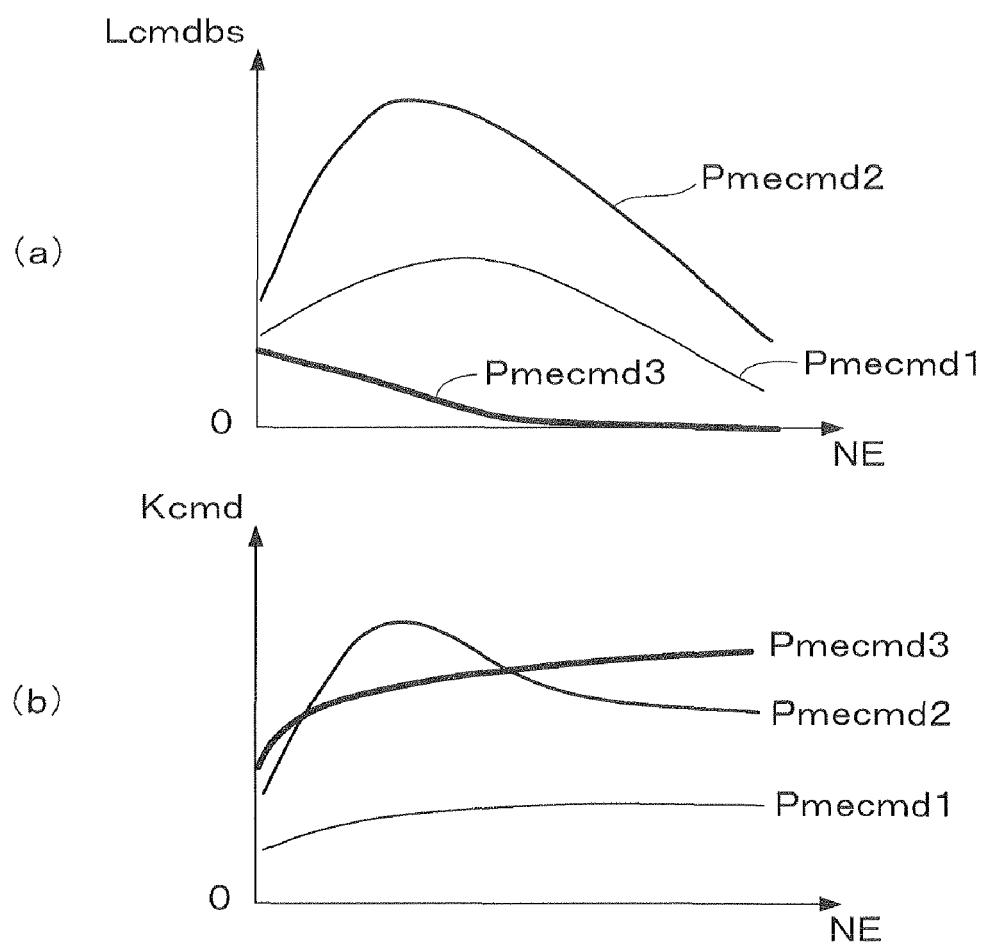

[FIG. 19]
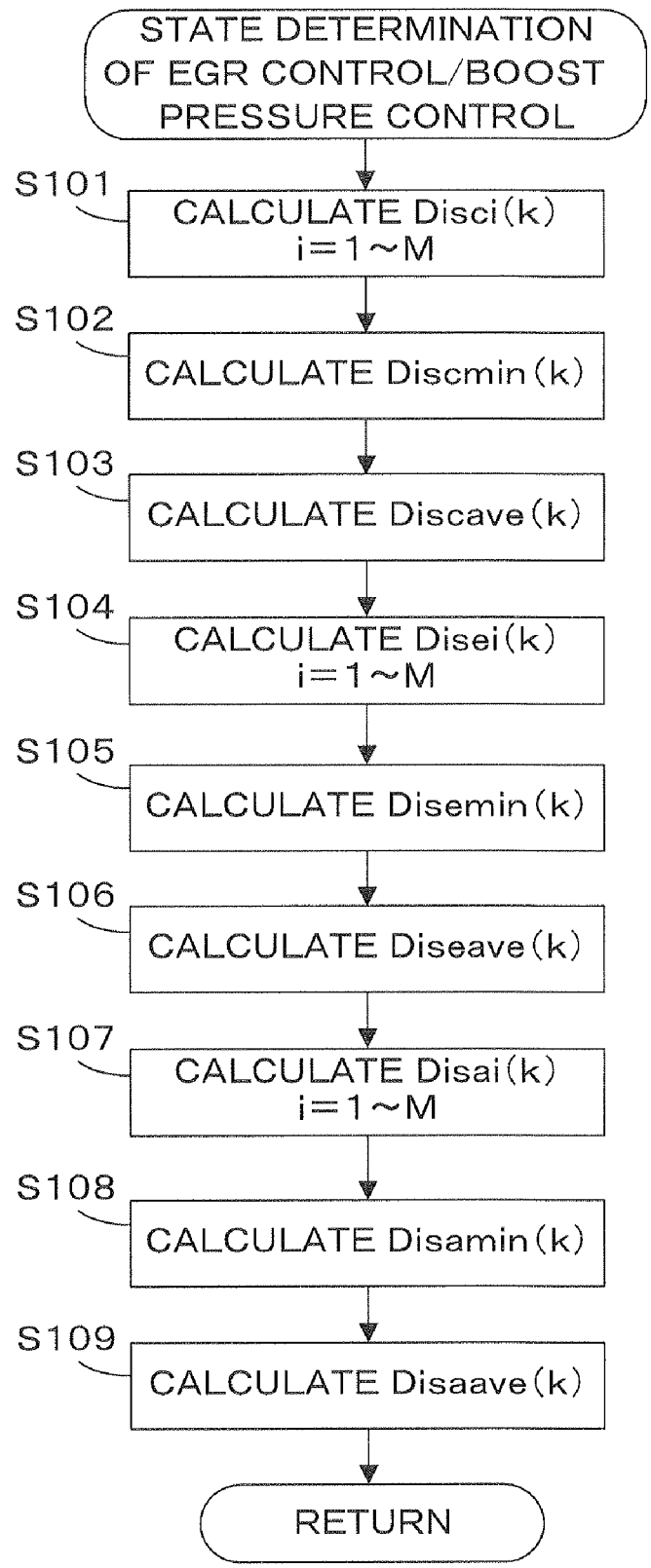

[FIG. 20]
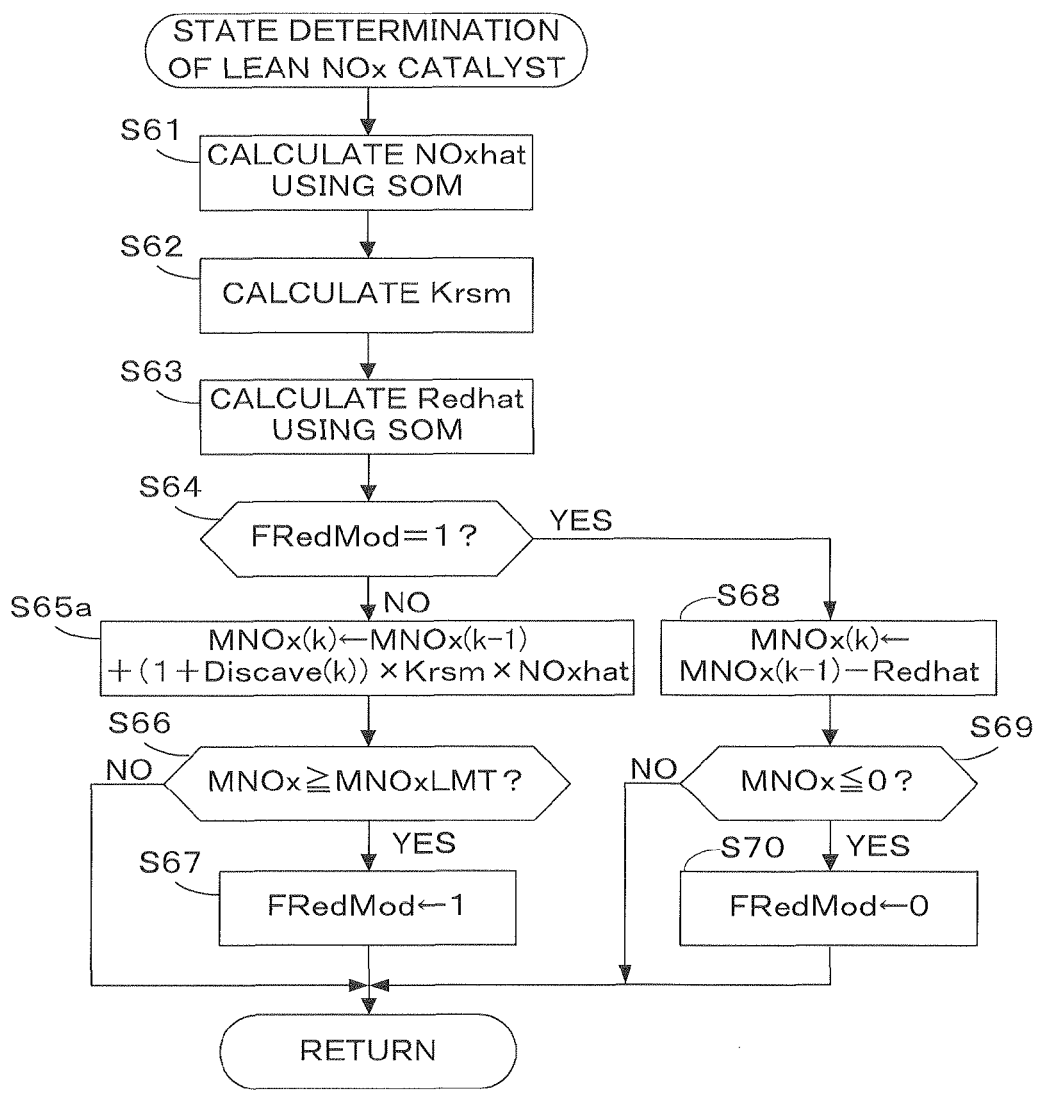

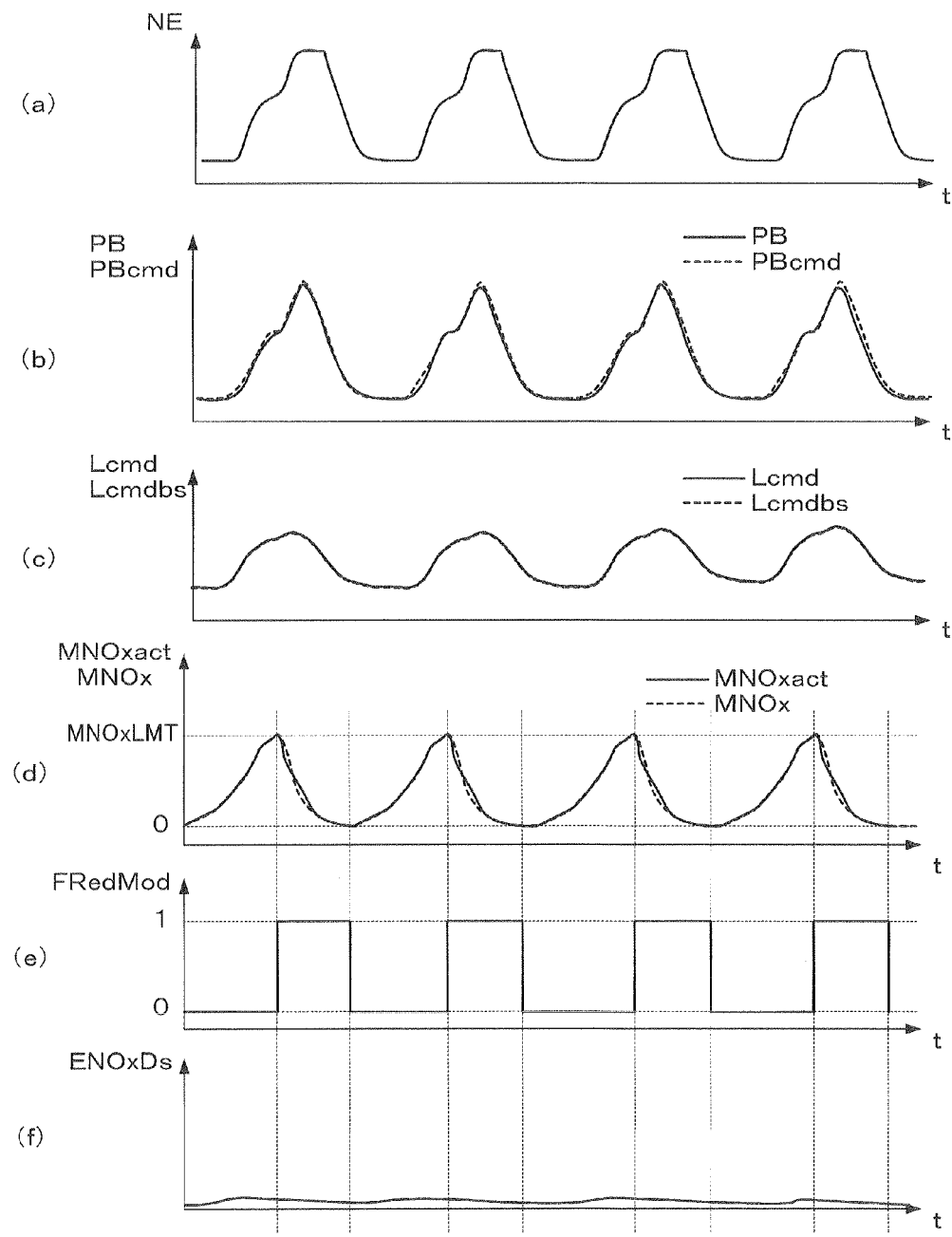
[FIG. 21]

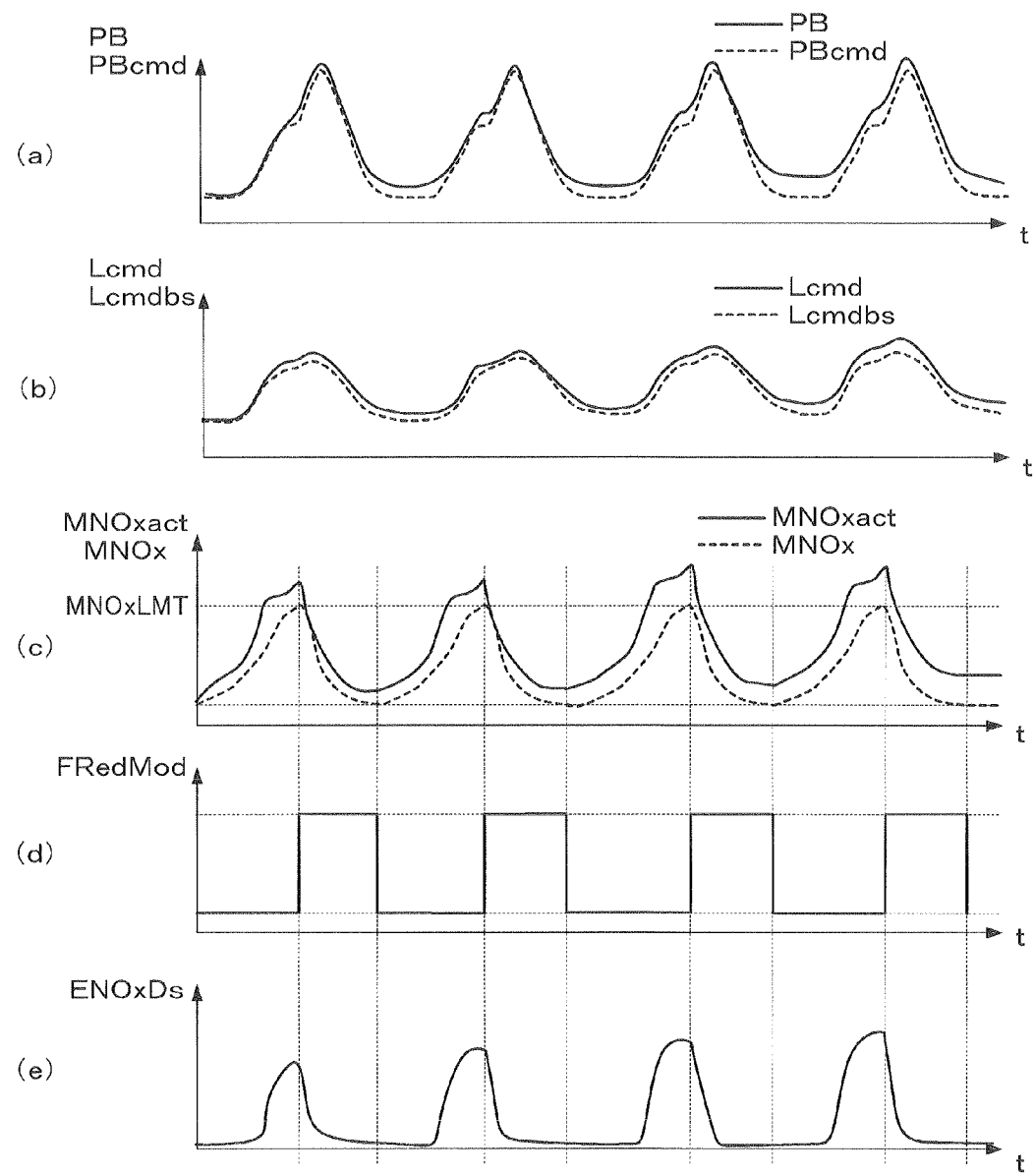
[FIG. 22]

[FIG. 23]
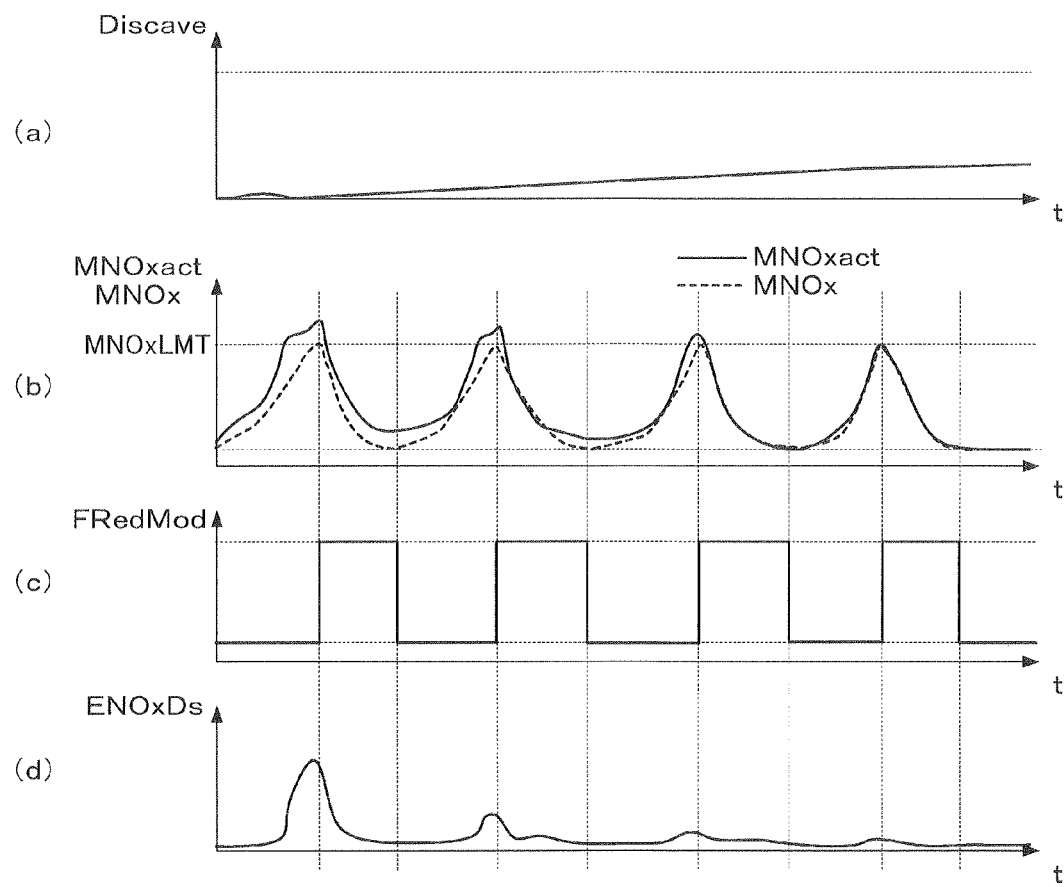

[FIG. 24]
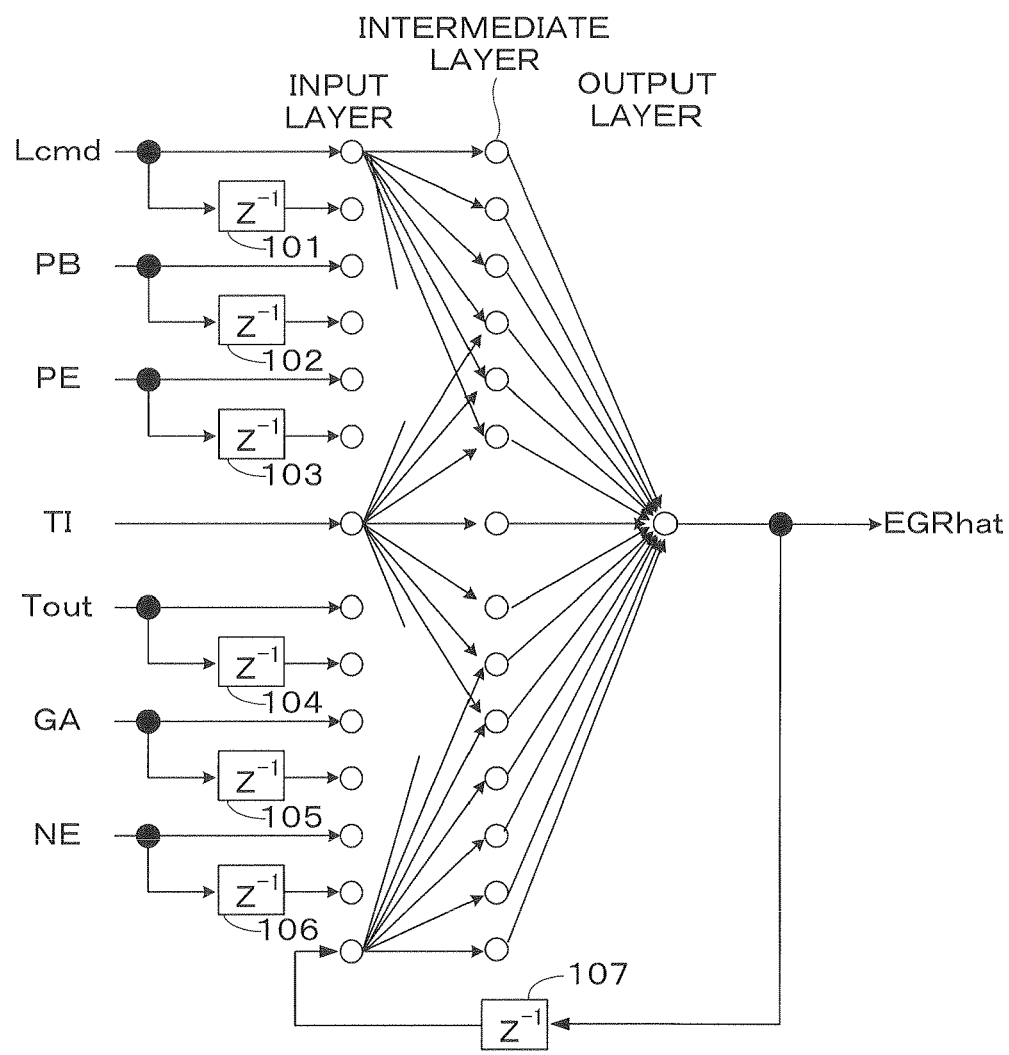

[FIG. 25]
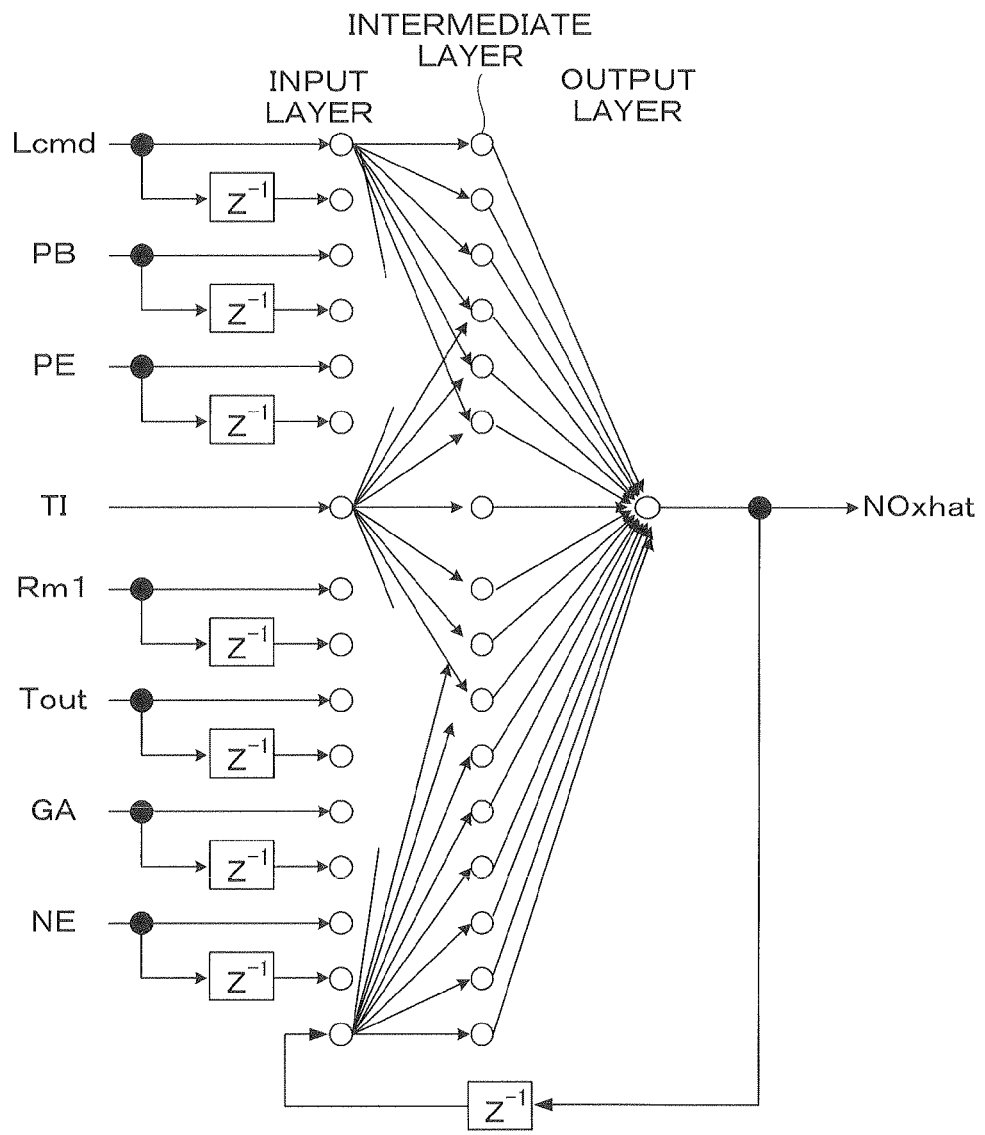

EXHAUST GAS PURIFYING APPARATUS FOR INTERNAL COMBUSTION ENGINE

TECHNICAL FIELD

The present invention relates to an exhaust gas purifying apparatus for an internal combustion engine, and particularly to an exhaust gas purifying apparatus for the internal combustion engine having a lean NOx catalyst in the exhaust system for removing NOx.

BACKGROUND ART

The patent document 1 shown below discloses an exhaust gas purifying apparatus for an internal combustion engine having a lean NOx catalyst in the exhaust system. The lean NOx catalyst traps NOx and reduces the trapped NOx. Since NOx is trapped in the lean NOx catalyst during a lean operation wherein the air-fuel ratio is set to a comparatively large value, it is necessary to timely supply reducing components (HC, CO) to the lean NOx catalyst so as to reduce the trapped NOx. In the apparatus shown in the patent document 1, an amount of NOx trapped in the lean NOx catalyst is estimated according to an engine rotational speed and a demand torque of the engine. The NOx amount in the feed gas (gas discharged from the combustion chamber of the engine) changes depending on an exhaust gas recirculation amount (an amount of exhaust gases recirculated to the intake system). Therefore, in the apparatus of the patent document 1, the amount of trapped NOx is corrected according to the exhaust gas recirculation amount.

The patent document 2 shown below discloses a NOx removing apparatus which removes NOx by the selective catalytic reduction (SCR) using urea. In this apparatus, a NOx emission amount is calculated using a neural network, and a supply amount of urea liquid is adjusted according to the calculated NOx emission amount. An intake pressure, an intake pipe temperature, a fuel consumption rate, etc. are used as input parameters of the neural network and the output parameter of the neural network is an amount of NOx emitted from the engine.

[Patent Document 1] Japanese Patent Laid Open No. 2006-214322

[Patent Document 2] Japanese Patent Laid Open No. 2003-328732

DISCLOSURE OF THE INVENTION

Problems to be Solved by the Invention

In the apparatus shown in the patent document 1, a deviation between a detected intake air flow rate and a target intake air flow rate is used as an exhaust gas recirculation amount parameter indicative of an actual exhaust gas recirculation amount, and a correction of the trapped NOx amount is performed according to the exhaust gas recirculation amount parameter. However, the exhaust gas recirculation amount is influenced by various factors, such as the boost pressure, the fuel injection amount, and the intake pressure. Therefore, it is difficult to estimate the actual exhaust gas recirculation amount using the maps or the tables which are previously set to calculate the exhaust gas recirculation amount, or using the physical model, even if the engine is operating in a steady operating condition. In a transient operating condition of the engine, the difficulty further increases. Therefore, the exhaust gas recirculation amount parameter shown in the patent document 1 does not accurately indicate the actual exhaust gas recirculation amount, and the correction cannot be performed accurately.

Particularly when controlling a diesel engine, a closed-loop control is performed wherein the exhaust gas recirculation amount is made to coincide with a target value based on the air-fuel ratio detected by an air-fuel ratio sensor, a detected value of the intake air flow rate by an air flow meter and the like, and/or another closed-loop control is performed wherein a vane opening of a turbocharger is adjusted so that the boost pressure coincides with a target pressure. Therefore, the control systems performing the above closed-loop controls intricately cooperate with each other, to accordingly compensate the characteristic variation or aging changes in the exhaust gas recirculation amount. Therefore, an accurate trapped NOx amount cannot be obtained by the simple method as shown the patent document 1, and the timing of performing a process for reducing NOx may be inappropriate, which may increase the NOx emission amount.

Further, in the apparatus of the patent document 2, the amount of NOx emitted from the engine is calculated using the neural network. However, the apparatus of the patent document 2 is not configured assuming that the lean NOx catalyst is used as the NOx removing device. Accordingly, the neural network is not applied for calculating an amount of NOx trapped in the lean NOx catalyst. When using the lean NOx catalyst, the function as the NOx removing device is maintained by appropriately reducing the trapped NOx. However, in the apparatus of the patent document 1, NOx is reduced with ammonia generated from urea, so that NOx trapping and reduction of the trapped NOx are not considered at all.

The present invention was made contemplating the above-described points and an object of the present invention is to provide an exhaust gas purifying apparatus for an internal combustion engine, which accurately estimates an amount of NOx trapped in a lean NOx catalyst as a NOx removing device, and appropriately performs the NOx reducing process.

Means for Solving the Problems

To attain the above object, the present invention provides an exhaust gas purifying apparatus for an internal combustion engine having a lean NOx catalyst in an exhaust system. The lean NOx catalyst traps NOx in exhaust gases when the exhaust gases are in an oxidizing state, and discharges the trapped NOx when the exhaust gases are in an reducing state. The exhaust gas purifying apparatus includes trapped NOx amount estimating means and reducing process means. The trapped NOx amount estimating means calculates an estimated trapped NOx amount (MNOx) which is an estimated value of an amount of NOx trapped in the lean NOx catalyst using a neural network. Engine operating parameters (Lcmd, PB, TI, PE, Tout, Rm1, GA, NE) indicative of an operating condition of the engine are input to the neural network and the neural network outputs at least one control parameter (NOxhat, Redhat) which is relevant to the lean NOx catalyst. The reducing process means performs a reducing process of the NOx trapped in the lean NOx catalyst, according to the estimated trapped NOx amount.

With this configuration, the estimated trapped NOx amount is calculated using the neural network which outputs at least one control parameter relevant to the lean NOx catalyst, wherein the engine operating parameter are input to the neural network. Further, the reducing process of the NOx trapped in the lean NOx catalyst is performed according to the estimated trapped NOx amount. The neural network is able to store nonlinear relationships among the input parameters. Accordingly, an accurate value of the control parameter(s) can be obtained not only in a steady operating condition but also in a transient operating condition of the engine, and hence the estimated trapped NOx amount can be calculated accurately. Consequently, the NOx reducing process is performed at an appropriate timing to thereby maintain the NOx emission amount at a low level.

Preferably, the neural network is a neural network to which a self-organizing map algorithm is applied.

With this configuration, the self-organizing map algorithm is applied to the neural network. In the self-organizing map, a combination of the input parameters and a pattern of appearance frequency of the input parameters are stored as a distribution of neurons. Therefore, by using the data corresponding to the appearance frequency in the actual engine operation as the training data, distribution intervals among neurons becomes comparatively narrow in the region corresponding to the operating condition of high appearance frequency, which enables estimation with high accuracy.

Preferably, the at least one control parameter relevant to the lean NOx catalyst is an estimated value of an amount of NOx discharged from the engine or an estimated value of an amount of reducing components discharged from the engine.

With this configuration, the estimated value of an amount of NOx discharged from the engine or the estimated value of an amount of reducing components discharged from the engine is output from the neural network, and the estimated trapped NOx amount is calculated using the output parameter of the neural network. The trapped NOx amount of the lean NOX catalyst depends on an amount of NOx flowing into the lean NOx catalyst and an amount of NOx reduced with the in-flowing reducing components. Accordingly, by calculating the estimated value of the in-flowing NOx amount and the estimated value of the in-flowing reducing component amount using the nueral networks, estimation accuracy of the estimated trapped NOx amount is improved.

BRIEF DESCRIPTION OF THE DRAWINGS

FIG. 1 shows a configuration of an internal combustion engine and a control system therefor according to a first embodiment of the present invention.

FIG. 2 shows a self-organizing map.

FIG. 3 shows changes in an estimated exhaust gas recirculation amount (EGRhat) and an actual exhaust gas recirculation amount (EGRact) with changes in engine operating parameters.

FIG. 4 is a flowchart of a fuel injection control process.

FIG. 5 shows maps referred to in the process of FIG. 4.

FIG. 6 shows maps referred to in the process of FIG. 4.

FIG. 7 illustrates a pilot injection and divided main injections of fuel.

FIG. 8 is a flowchart of a process for performing a state determination of an exhaust gas recirculation amount.

FIG. 9 illustrates relationships between the estimated exhaust gas recirculation amount (EGRhat) and the actual exhaust gas recirculation amount (EGRact).

FIG. 10 is a flowchart of a process for performing a state determination of the lean NOx catalyst.

FIG. 11 shows a map referred to in the process of FIG. 10.

FIG. 12 shows time charts for illustrating examples of the control operation in the first embodiment.

FIG. 13 shows time charts for illustrating examples of the control operation in the first embodiment.

FIG. 14 shows time charts for illustrating examples of the control operation in the first embodiment.

FIG. 15 shows a configuration of an internal combustion engine and a control system therefor according to a second embodiment of the present invention.

FIG. 16 is a flowchart of a fuel injection control process according to the second embodiment.

FIG. 17 is a flowchart of a fuel injection control process according to the second embodiment.

FIG. 18 shows maps referred to in the process of FIG. 16.

FIG. 19 is a flowchart of a process for performing a state determination of an exhaust gas recirculation control and a boost pressure control.

FIG. 20 is a flowchart of a process for performing a state determination of the lean NOx catalyst.

FIG. 21 shows time charts for illustrating examples of the control operation in the second embodiment.

FIG. 22 shows time charts for illustrating examples of the control operation in the second embodiment.

FIG. 23 shows time charts for illustrating examples of the control operation in the second embodiment.

FIG. 24 illustrates a perception for calculating the estimated exhaust gas recirculation amount (EGRhat).

FIG. 25 illustrates a perceptron for calculating an estimated NOx emission amount (NOxhat).

DESCRIPTION OF REFERENCE NUMERALS

1 Internal combustion engine
20 Electronic control unit (trapped NOx amount estimating means, reducing process means)
31 Lean NOx catalyst

BEST MODE FOR CARRYING OUT THE INVENTION

Preferred embodiments of the present invention will now be described with reference to the drawings.

First Embodiment

FIG. 1 is a schematic diagram showing a configuration of an internal combustion engine and a control system therefor according to a first embodiment of the present invention. The internal combustion engine 1 (hereinafter referred to as "engine") is a diesel engine wherein fuel is injected directly into the cylinders. Each cylinder is provided with a fuel injection valve 9 that is electrically connected to an electronic control unit 20 (hereinafter referred to as "ECU"). The ECU 20 controls a valve opening timing and a valve opening period of each fuel injection valve 9.

The engine 1 has an intake pipe 2, an exhaust pipe 4, and a turbocharger 8. The turbocharger 8 includes a turbine 11 and a compressor 16. The turbine 11 has a turbine wheel 10 rotationally driven by the kinetic energy of exhaust gases. The compressor 16 has a compressor wheel 15 connected to the turbine wheel 10 via a shaft 14. The compressor wheel 15 pressurizes (compresses) the intake air of the engine 1.

The turbine 11 has a plurality of movable vanes 12 (only two are illustrated) and an actuator (not shown) for actuating the movable vanes 12 to open and close. The plurality of movable vanes 12 are actuated to open and close for changing a flow rate of exhaust gases that are injected to the turbine wheel 10. The turbine 11 is configured so that the flow rate of exhaust gases injected to the turbine wheel 10 is changed by changing an opening of the movable vane 12 (hereinafter referred to as "vane opening") $\theta$ vgt, to change the rotational speed of the turbine wheel 10. The actuator which actuates the movable vanes 12 is connected to the ECU 20, and the vane opening θ vgt is controlled by the ECU 20. Specifically, the ECU 20 supplies a control signal of a variable duty ratio to the actuator and controls the vane opening θ vgt by the control signal. The configuration of the turbocharger having movable vanes is widely known, for example, disclosed in Japanese Patent Laid-open No. H01-208501.

The intake pipe 2 is provided with an intercooler 18 downstream of the compressor 16, and a throttle valve 3 downstream of the intercooler 18. The throttle valve 3 is configured to be actuated to open and close by an actuator 19, and the actuator 19 is connected to the ECU 20. The ECU 20 performs an opening control of the throttle valve 3 through the actuator 19.

An exhaust gas recirculation passage 5 for recirculating exhaust gases to the intake pipe 2 is provided between the exhaust pipe 4 and the intake pipe 2. The exhaust gas recirculation passage 5 is provided with an exhaust gas recirculation control valve 6 (hereinafter referred to as "EGR valve 6") that controls the amount of exhaust gases (EGR amount) that are recirculated. The EGR valve 6 is an electromagnetic valve having a solenoid. A valve opening of the EGR valve 6 is controlled by the ECU 20. The EGR valve 6 is provided with a lift sensor 7 for detecting a valve opening (a valve lift amount) LACT, and the detection signal is supplied to the ECU 20. The exhaust gas recirculation passage 5 and the EGR valve 6 constitute an exhaust gas recirculation device. The exhaust gas recirculation passage 5 is provided with an exhaust gas recirculation amount sensor 26 for detecting an exhaust gas recirculation amount EGRact, and the detection signal is supplied to the ECU 20. The exhaust gas recirculation amount EGRact is actually detected as a flow rate (mass/time).

An intake air flow rate sensor 21, a boost pressure sensor 22, an intake air temperature sensor 23, and an intake pressure sensor 24 are disposed in the intake pipe 2. The intake air flow rate sensor 21 detects an intake air flow rate GA. The boost pressure sensor 22 detects an intake pressure (boost pressure) PB at a portion of the intake pipe 2 downstream of the compressor 16. The intake air temperature sensor 23 detects an intake air temperature TI. The intake pressure sensor 24 detects an intake pressure PI. Further, an exhaust pressure sensor 25 is disposed in the exhaust pipe 4. The exhaust pressure sensor 25 detects an exhaust pressure PE at a portion of the exhaust pipe 4 upstream of the turbine 11. These sensors 21 to 25 are connected to the ECU 20, and the detection signals from the sensors 21 to 25 are supplied to the ECU 20.

A lean NOx catalyst 31 and a particulate filter 32 are disposed downstream of the turbine 11 in the exhaust pipe 4. The lean NOx catalyst 31 is a NOx removing device for removing NOx contained in the exhaust gases. The particulate filter 32 traps particulate matter (which mainly consists of soot) contained in the exhaust gases. The lean NOx catalyst 31 is configured so that NOx is trapped in a state where an oxygen concentration in the exhaust gases is comparatively high, i.e., a concentration of reducing components (HC, CO) is comparatively low, and the trapped NOx is reduced by the reducing components and discharged in a state where the reducing components concentration in the exhaust gases is comparatively high.

An accelerator sensor 27, an engine rotational speed sensor 28, and an atmospheric pressure sensor 29 are connected to the ECU 20. The accelerator sensor 27 detects an operation amount AP of an accelerator pedal (not shown) of the vehicle driven by the engine 1 (hereinafter preferred to as "accelerator pedal operation amount AP"). The engine rotational speed sensor 28 detects an engine rotational speed NE. The atmospheric pressure sensor 29 detects an atmospheric pressure PA. The detection signals of these sensors are supplied to the ECU 20. The engine rotational speed sensor 28 supplies a crank angle pulse and a TDC pulse to the ECU 20. The crank angle pulse is generated at every predetermined crank angle (e.g., 6 degrees). The TDC pulse is generated in synchronism with a timing when a piston in each cylinder of the engine 1 is located at the top dead center.

The ECU 20 includes an input circuit, a central processing unit (hereinafter referred to as "CPU"), a memory circuit, and an output circuit. The input circuit performs various functions, including shaping the waveforms of input signals from various sensors, correcting the voltage levels of the input signals to a predetermined level, and converting analog signal values into digital values. The memory circuit preliminarily stores various operating programs to be executed by the CPU and stores the results of computations or the like by the CPU. The output circuit supplies control signals to the actuator for actuating the movable vanes 12 of the turbine 11, the fuel injection valves 9, the EGR valve 6, the actuator 19 for actuating the throttle valve 3, and the like.

The ECU 20 performs a fuel injection control with the fuel injection valve 9, an exhaust gas recirculation control with the EGR valve 6, a boost pressure control with the movable vanes 12, and the like according to an engine operating condition (which is indicated mainly by the engine rotational speed NE and an engine load target value Pmecmd). The engine load target value Pmecmd is calculated according to the accelerator pedal operation amount AP, and is set so as to increase as the accelerator pedal operation amount AP increases.

In this embodiment, the fuel injection by the fuel injection valve 9 is performed with a main injection MI and a pilot injection PI preceding the main injection MI. Further, in a predetermined operating condition of the engine 1 (specifically, a condition where the engine rotational speed NE is lower than a predetermined high speed NEH), the main injection MI is performed by two divided injections, i.e., a first main injection MI1 and a second main injection MI2. A dividing ratio Rm1 of the fuel injection amount is defined as "first main injection amount/(first main injection amount+ second main injection amount)", and is basically set according to the engine rotational speed NE and the engine load target value Pmecmd.

Further, the ECU 20 calculates an estimated value of an exhaust gas recirculation amount (hereinafter referred to as "estimated exhaust gas recirculation amount") EGRhat by using a neural network to which a self-organizing map algorithm is applied. This neural network is hereinafter referred to simply as "self-organizing map". The ECU 20 corrects the dividing ratio Rm1 using the estimated exhaust gas recirculation amount EGRhat and the actual exhaust gas recirculation amount EGRact detected by the exhaust gas recirculation amount sensor 26. By performing this correction, the influence of characteristic variation or aging changes in the engine 1 and its peripheral devices mounted on the engine 1 (e.g, the exhaust gas recirculation device, the intake air flow rate sensor) are suppressed, thereby improving the robustness of the NOx emission amount.

The self-organizing map will be hereinafter described in detail.

An input data vector xj which consists of "N" elements is defined by the following equation (1), and a weighting vector wi of each neuron which constitutes the self-organizing map is defined by the following equation (2). A number of neurons is expressed by "M". That is, a parameter "i" takes values from "1" to "M". An initial value of the weighting vector wi is given using a random number.

$$xj=(xj1, xj2, \ldots, xjN) \quad (1)$$

$$wi=(wi1, wi2, \ldots, wiN) \quad (2)$$

With respect to each of "M" neurons, an Euclid distance DWX (=|wi−xj|) between the input data vector xj and the weighting vector wi of the corresponding neuron is calculated. A neuron whose distance DWX takes a minimum value is defined as the winner neuron. The Euclid distance DWX is calculated by the following equation (3).

[Eq. 1]

$$DWX = \sqrt{\sum_{k=1}^{N} (wik - xjk)^2} \quad (3)$$

Next, the weighting vectors wi of the winner neuron and neurons contained in a neuron set Nc in the vicinity of the winner neuron are updated by the following equation (4). In the equation (4), "α(t)" is a training coefficient, and "t" is a number of times of training (hereinafter referred to simply as "training number"). The training coefficient α(t) is, for example, set to "0.8" as an initial value, and set so as to decrease as the training number "t" increases.

$$wi(t+1)=wi(t)+\alpha(t)(xj-wi(t)) \quad (4)$$

The weighting vectors wi of the neurons which are not contained in the neuron set Nc maintain a preceding value as shown by the following equation (5).

$$wi(t+1)=wi(t) \quad (5)$$

It is to be noted that the neuron set Nc is also a function of the training number "t", and is set so that a range of the vicinity of the winner neuron becomes narrow as the training number "t" increases. The weighting vectors of the winner neuron and the neurons in the vicinity of the winner neuron are modified by updating with the equation (4) to approach the input data vector.

If the calculation according to the training rule described above is performed with respect to many input data vectors, the distribution of "M" neurons results in reflecting the distribution of the input data vectors. For example, when the input data vectors are simplified to two-dimensional vectors and the distribution of the input data vectors is expressed on a two-dimensional plane, the neurons distribute uniformly over the plane if the input data vectors distribute uniformly over the plane. If nonuniformity is in the distribution of the input data vectors (if changes in the distribution density exist), the distribution of the neurons finally becomes a distribution having similar nonuniformity.

The self-organizing map obtained as described above may be further modified by applying the learning vector quantization (LVQ) algorithm, thereby obtaining a more suitable distribution of the neurons.

FIG. 2 shows a self-organizing map for calculating the estimated exhaust gas recirculation amount EGRhat in this embodiment, as a two-dimensional map. This two-dimensional map is defined by a lift amount command value Lcmd of the EGR valve 6 and the boost pressure PB which are two input parameters as the most dominant factors. An input data vector xEGR is defined by the following equation (10). That is, the input parameters are the lift amount command value Lcmd, the boost pressure PB, the intake air temperature TI, the exhaust pressure PE, a fuel injection amount Tout, the intake air flow rate GA, and the engine rotational speed NE. The fuel injection amount Tout is a total fuel injection amount in one combustion cycle including a pilot injection amount and a main injection amount described later.

$$xEGR=(Lcmd, PB, TI, PE, Tout, GA, NE) \quad (10)$$

The map shown in FIG. 2 is divided into a plurality of regions RNRi (i=1 to M, M=36). Each region includes one neuron NRi (plotted with "*"). By previously performing the training (learning) with a lot of input data vectors xEGR, the position (weighting vector wi) of each neuron NRi is determined. Each region RNRi is defined by drawing borderlines in consideration of the positional relationships with the adjacent neurons. By making the distribution of the input data vector xEGR applied upon training coincide with an actual distribution appearing in the actual engine operation, the distribution density of the neuron NRi becomes comparatively high in the regions corresponding to an engine operating condition with high appearance frequency during the actual engine operation. With this feature of the self-organizing map, accuracy of the estimated exhaust gas recirculation amount in the operating conditions with high appearance frequency can be improved. The map shown in FIG. 2 is obtained by performing the training corresponding to the reference engine (which is new and has an average operating characteristic). In FIG. 2, the input data applied to the training are plotted with black dots.

When training the self-organizing map, a weighting coefficient vector Ci (i=1 to M) expressed by the following equation (11) is calculated and stored using the input data vector xEGR and the actual exhaust gas recirculation amount EGRact corresponding to the input data vector xEGR. The weighting coefficient vector Ci is calculated and stored corresponding to each neuron NRi.

$$Ci=(C0i, C1i, C2i, C3i, C4i, C5i, C6i, C7i) \quad (11)$$

In the actual control operation, the region RNRi which includes the present operating point on the map is first selected. The operating point is defined by the lift amount command value Lcmd and the boost pressure PB which are elements of the input data vector xEGR. Next, the weighting coefficient vector Ci, which corresponds to the neuron NRi representing the region RNRi, and the input data vector xEGR are applied to the following equation (12), to calculate the estimated exhaust gas recirculation amount EGRhat.

$$EGRhat = C1i \times Lcmd + C2i \times PB + C3i \times TI + \\ C4i \times PE + C5i \times Tout + C6i \times GA + C7i \times NE + C0i \quad (12)$$

FIG. 3(a) is a time chart showing changes in the estimated exhaust gas recirculation amount EGRhat and the actual exhaust gas recirculation amount EGRact. FIG. 3(b) is a time chart showing changes in the corresponding main input data. From these figures, it is confirmed that accurate calculated values of the estimated exhaust gas recirculation amount EGRhat are obtained not only in the steady state where the engine operating condition is comparatively stable but also in the transient state.

Next, the fuel injection control using the estimated exhaust gas recirculation amount EGRhat is described below. FIG. 4 is a flowchart of the fuel injection control process. This process is executed by the CPU in the ECU 20 in synchronism with the TDC pulse.

In step S41, a Lcmd map shown in FIG. 5(a) is retrieved according to the engine rotational speed NE and the engine load target value Pmecmd, to calculate the EGR valve lift amount command value Lcmd.

Pmecmd1, Pmecmd2, and Pmecmd3 shown in FIG. 5(a) are predetermined engine load target values, and the relationship of "Pmecmd1<Pmecmd2<Pmecmd3" is satisfied. Therefore, when the engine load target value Pmecmd increases from a value corresponding to a low-load condition, the EGR valve lift amount command value Lcmd increases until the predetermined engine load target value Pmecmd2. When the engine load target value Pmecmd further increases, the EGR valve lift amount command value Lcmd decreases. That is, according to the Lcmd map shown in FIG. 5(a), the EGR valve lift amount command value Lcmd is set to a comparatively great value in order to reduce the NOx emission amount in the ordinarily-used operating region of the engine (medium-speed and medium-load engine operating region). Further, the EGR valve lift amount command value Lcmd is set to a comparatively small value in order to ensure a sufficient output torque of the engine in a high-load engine operating region. Further, the EGR valve lift amount command value Lcmd is set to a comparatively small value in order to ensure stable combustion in a low-speed engine operating region.

In step S42, a PBcmd map shown in FIG. 5(b) is retrieved according to the engine rotational speed NE and the engine load target value Pmecmd, to calculate a target boost pressure PBcmd. The PBcmd map is set in the low-speed engine operating region so that the target boost pressure PBcmd increases as the engine rotational speed NE increases, and the target boost pressure PBcmd increases as the engine load target value Pmecmd increases. In the medium-speed and medium-load engine operating region, the target boost pressure PBcmd is set comparatively high in order to ensure the fresh air amount since the EGR amount is increased. The vane opening θvgt of the turbine is controlled according to the target boost pressure PBcmd.

In step S43, a Tout map shown in FIG. 5(c) is retrieved according to the engine rotational speed NE and the engine load target value Pmecmd, to calculate the fuel injection amount Tout. The Tout map is set so that the fuel injection amount Tout increases as the engine rotational speed NE increases and/or the engine load target value Pmecmd increases. The Tout map is set so that an actual air-fuel ratio in the combustion chamber coincides with a target air-fuel ratio when the actual boost pressure PB coincides with the target boost pressure PBcmd; the actual exhaust gas recirculation amount EGRact coincides with a desired value; and an actual fuel injection amount coincides with the fuel injection amount Tout.

In step S44, a state determination process of the exhaust gas recirculation amount (EGR amount) shown in FIG. 8 is executed, to calculate the estimated exhaust gas recirculation amount EGRhat, and correlation parameters a(k) and b(k) which indicate a relationship between the estimated exhaust gas recirculation amount EGRhat and the detected actual exhaust gas recirculation amount EGRact. "k" indicates a control time digitized with the execution period of this process.

When the correlation parameter a(k) calculated in step S44 takes a value in the vicinity of "1.0", this indicates that the actual exhaust gas recirculation amount EGRact substantially coincides with the estimated exhaust gas recirculation amount EGRhat approximating an actual exhaust gas recirculation amount of the reference engine. Further, when the correlation parameter a(k) is less than "1.0", this indicates that the actual exhaust gas recirculation amount EGRact takes a smaller value compared with the estimated exhaust gas recirculation amount EGRhat, i.e., the actual exhaust gas recirculation amount EGRact is less than a desired value due to the characteristic variation or aging of the engine. Conversely, when the correlation parameter a(k) is greater than "1.0", this indicates that the actual exhaust gas recirculation amount EGRact takes a greater value compared with the estimated exhaust gas recirculation amount EGRhat, i.e., the actual exhaust gas recirculation amount EGRact is greater than the desired value due to the characteristic variation of the engine.

In step S45, the state determination process of the lean NOx catalyst shown in FIG. 10 is performed to calculate a trapped NOx amount MNOx which is an amount of NOx trapped in the lean NOx catalyst 31 as well as to set a NOx reduction mode flag FRedMod. The NOx reduction mode flag FRedMod is set to "1" when performing a NOx reduction process in order to reduce NOx trapped in the lean NOx catalyst 31. In the NOx reduction process, the post injection (fuel injection in the explosion stroke after performing the main injection or in the exhaust stroke) is performed for supplying reducing components to the exhaust system.

In step S46, a Toutp map shown in FIG. 6(a) is retrieved according to the engine rotational speed NE and the engine load target value Pmecmd, to calculate a pilot injection fuel amount Toutp which is a fuel injection amount of the pilot injection PI. The Toutp map is set so that the pilot injection amount Toutp increases in order to reduce the combustion noise in the low-speed and low-load engine operating region wherein an ignition delay of the injected fuel becomes comparatively great, and in the medium-speed and medium-load engine operating region wherein the exhaust gas recirculation amount is increased.

In step S47, a Rm1 map shown in FIG. 6(b) is retrieved according to the engine rotational speed NE and the engine load target value Pmecmd, to calculate a dividing ratio Rm1. The dividing ratio Rm1 is defined by the following equation (13). In the equation (13), "Toutm1" is a first main injection amount, and "Toutm2" is a second main injection amount.

$$Rm1 = Toutm1/(Toutm1+Toutm2) \quad (13)$$

According to the Rm1 map, the dividing ratio Rm1 is set to "1.0" in the high-speed engine operating region, since the divided main injections cannot be performed due the response delay of the fuel injection valve 9. In the low-load and the medium-load engine operating regions, the divided main injections are performed in order to reduce the NOx emission amount, and the Rm1 map is set so that the dividing ratio Rm1 mostly decreases in the medium-speed and medium-load engine operating region. Further, in the high-load engine operating region, the divided main injections are performed in order to reduce the maximum cylinder pressure, thereby reducing the combustion noise.

The typical relationship of the pilot injection amount Toutp, the first main injection amount Toutm1, and the second main injection amount Toutm2 is shown in FIG. 7. The horizontal axis of FIG. 7 is the crank angle CA, and the execution timing of each injection is indicated.

In step S48, a basic main injection amount Toutmbs(k) is calculated by the following equation (14). The calculated basic main injection amount Toutmbs(k) and the dividing ratio Rm1 are applied to the following equation (15), to calculate a first main injection basic amount Toutm1bs(k). Further, the first main injection amount Toutm1(k) is calculated by the equation (16).

$$Toutmbs(k) = Tout(k) - Toutp(k) \quad (14)$$

$$Toutm1(k) = Rm1 \times Toutmbs(k) \quad (15)$$

In step S49, the second main injection amount Toutm2(k) is calculated by the following equation (17).

$$Toutm2(k) = Toutmbs(k) - Toutm1(k) \quad (17)$$

In step S50, it is determined whether or not the NOx reduction mode flag FRedMod is equal to "1". If the answer to step S50 is affirmative (YES), the process proceeds to step S51, in which a Toutpost map shown in FIG. 6(c) is retrieved according to the engine rotational speed NE and the engine load target value Pmecmd, to calculate a post injection amount (a fuel injection amount of the post injection) Toutpost. The Toutpost map is set so that the post injection amount Toutpost increases as the engine rotational speed NE increases and/or the engine load target value Pmecmd increases. By increasing the post injection amount Toutpost corresponding to an increase in the intake air flow rate, the concentration of reducing components in the exhaust gases is controlled to the desired value.

If FRedMod is equal to "0" in step S50, the process immediately proceeds to step S52.

In step S52, it is determined whether or not the correlation parameter a(k) is equal to or less than a determination threshold value AOBDLMT. If the answer to step S52 is affirmative (YES), it is determined that the exhaust gas recirculation device has failed (for example, clogging of the EGR valve 6 has occurred), and a warning lamp is turned on (step S53). If a(k) is greater than AOBDLMT, the process immediately ends.

FIG. 8 is a flowchart of the state determination process of the EGR amount executed in step S44 of FIG. 4.

In step S31, the estimated exhaust gas recirculation amount EGRhat is calculated using the self-organizing map (SOM) described above. That is, the neuron NRi is selected according to the EGR valve lift amount command value Lcmd and the boost pressure PB, and the weighting coefficient vector Ci corresponding to the neuron NRi and the input parameters are applied to the equation (12), to calculate the estimated exhaust gas recirculation amount EGRhat.

In step S32, the actual exhaust gas recirculation amount EGRact is detected by the exhaust gas recirculation amount sensor 26. In step S33, the correlation parameters a(k) and b(k), which indicate the relationship between the estimated exhaust gas recirculation amount EGRhat and the actual exhaust gas recirculation amount EGRact, are calculated with a sequential identifying (sequential statistical processing) algorithm.

FIG. 9 illustrates the relationships between the estimated exhaust gas recirculation amount EGRhat and the actual exhaust gas recirculation amount EGRact. With respect to the reference engine, the estimated exhaust gas recirculation amount EGRhat substantially coincides with the actual exhaust gas recirculation amount EGRact. Accordingly, data points (hereinafter referred to as "correlation data points") defined by the estimated exhaust gas recirculation amount EGRhat and the actual exhaust gas recirculation amount EGRact distribute, as shown in FIG. 9(a) for example, in the region RD1 with hatching. The region RD1 is defined around the central straight line L1 and the inclination of the line L1 is equal to "1".

With respect to an engine having a characteristic that the actual exhaust gas recirculation amount EGRact is comparatively great compared with the reference engine, the correlation data points are distributed, for example, in the region RD2 of FIG. 9(b). Conversely, with respect to an engine having a characteristic that the actual exhaust gas recirculation amount EGRact is comparatively small due to, for example, clogging of the EGR valve, the correlation data points distribute in the region RD3 of FIG. 9B(b), for example. If the state of clogging becomes worse, the distribution of the correlation data points shifts to the region RD4.

Therefore in this embodiment, the correlation parameters a(k) and b(k) which correspond to the approximated straight line L2 as shown in FIG. 9(c), are calculated from the distribution of the correlation data points, wherein the engine control parameter is corrected according to the correlation parameter a(k) indicative of the inclination of the approximated straight line L2. Further, if the correlation parameter a(k) is less than the determination threshold value AOBDLMT (for example, when the correlation data points distribute in the region RD4), it is determined that the exhaust gas recirculation device has failed, and the warning lamp is turned on (FIG. 4, steps S52 and S53).

The calculation method of the correlation parameters a(k) and b(k) is described below. The sequential identifying algorithm is a least squares method algorithm for calculating the present values a(k) and b(k) of the correlation parameters, based on the present values (latest values) EGRhat(k) and EGRact(k) of the data to be processed and the preceding values a(k−1) and b(k−1) of the correlation parameters.

If a correlation parameter vector θCR(k) including the correlation parameters a(k) and b(k) as elements is defined by the following equation (21), the correlation parameter vector θCR(k) is calculated by the following equation (22) according to the sequential identifying algorithm.

$$\theta CR(k)^T = [a(k) b(k)] \quad (21)$$

$$\theta CR(k) = \theta CR(k-1) + KP(k) \times eid(k) \quad (22)$$

in the equation (22), "eid(k)" is an identification error defined by the following equations (23) and (24). "KP(k)" is a gain coefficient vector defined by the following equation (25), and "P(k)" in the equation (25) is a second-order square matrix calculated by the following equation (26).

$$eid(k) = EGRact(k) - \theta CR(k-1)^T \zeta(k) \quad (23)$$

$$\zeta^T(k) = [EGRhat(k) \ 1] \quad (24)$$

[Eq. 2]

$$KP(k) = \frac{P(k)\zeta(k)}{1 + \zeta^T(k)P(k)\zeta(k)} \quad (25)$$

$$P(k+1) = \frac{1}{\lambda_1}\left(I - \frac{\lambda_2 P(k)\zeta(k)}{\lambda_1 + \lambda_2 \zeta^T(k)P(k)\zeta(k)}\right)P(k) \quad (26)$$

The coefficient λ1 in the equation (26) is set to a value from "0" to "1", and the coefficient λ2 is set to "1". "I" is a unit matrix.

According to the sequential identifying algorithm by the equations (21) to (26), the statistic processing operation can be simplified.

If the correlation parameters a(k) and b(k) are used, a statistically processed exhaust gas recirculation amount EGRIs is given by the following equation (27). The equation (27) is a linear expression corresponding to the straight line L2 shown in FIG. 9(c).

$$EGRIs = a(k) \times EGRhat + b(k) \quad (27)$$

According to the process of FIG. 8, the correlation parameters a(k) and b(k), which indicate the relationship between the actual exhaust gas recirculation amount EGRact and the estimated exhaust gas recirculation amount EGRhat, are calculated by the sequential statistical processing. Accordingly, even if the boost pressure PB, the engine rotational speed NE, and the like, which are the input parameters of the neural network, fluctuate at comparatively high frequencies due to noise, the influence of such fluctuation can be eliminated.

FIG. 10 is a flowchart of the state determination process of the lean NOx catalyst executed in step S45 of FIG. 4.

In step S61, an estimated NOx emission amount NOxhat is calculated using a self-organizing map (hereinafter referred to as "NOx emission amount SOM") for calculating the NOx emission amount. The NOx emission amount SOM is set corresponding to the reference engine by the same method as that for the self-organizing map for calculating the estimated exhaust gas recirculation amount EGRhat (hereinafter referred to as "EGR amount SOM"). The NOx emission amount SOM is used in order to calculate the estimated NOx emission amount NOxhat from an input data vector xNOx shown by the following equation (31). That is, the input parameters of the NOx emission amount SOM are the lift amount command value Lcmd of the EGR valve, the boost pressure PB, the intake air temperature TI, the exhaust pressure PE, the fuel injection amount Tout, the dividing ratio Rm1, the intake air flow rate GA, and the engine rotational speed NE.

$$xNOx=(Lcmd,PB,TI,PE,Tout,Rm1,GA,NE) \quad (31)$$

A weighting coefficient vector CNOxi shown by the following equation (32) is stored corresponding to each neuron NRNOxi of the NOx emission amount SOM.

$$CNOxi=(CNOx0i,CNOx1i,CNOx2i,CNOx3i,CNOx4i,\\CNOx5i,CNOx6i,CNOx7i,CNOx8i) \quad (32)$$

Therefore, the neuron NRNOxi is first selected according to the lift amount command value Lcmd and the boost pressure PB. Next, the weighting coefficient vector CNOXi of the selected neuron NRNOxi is applied to the following equation (33), to calculate the estimated NOx emission amount NOxhat.

$$NOxhat = CNOx1i \times Lcmd + CNOx2i \times PB + \\ CNOx3i \times TI + CNOx4i \times PE + CNOx5i \times Tout + \\ CNOx6i \times Rm1 + CNOx7i \times GA + CNOx8i \times NE + CNOx0i \quad (33)$$

In step S62, a Krsm map shown in FIG. 11 is retrieved according to the engine rotational speed NE and the engine load target value Pmecmd, to calculate a modifying coefficient Krsm. The modifying coefficient Krsm is applied to a calculation of an amount MNOx of NOx trapped in the lean NOx catalyst in step S65. The Krsm map is set like the Lcmd map for calculating the lift amount command value Lcmd. That is, the modifying coefficient Krsm is set so as to increase in the medium-load and medium-speed operating region where the exhaust gas recirculation amount is made to increase, since it is necessary to increase a correction degree of the NOx emission amount by the correlation parameter a(k) as the exhaust gas recirculation amount increases.

In step S63, an estimated reducing component emission amount Redhat is calculated using a self-organizing map (hereinafter referred to as "reducing component emission amount SOM") for calculating an amount of reducing components (HC, CO) discharged from the engine. The estimated reducing component emission amount Redhat takes a value which is converted so as to indicate an amount of NOx reduced by the discharged reducing components.

The reducing component emission amount SOM is set corresponding to the reference engine by the same method of the EGR amount SOM, and is used for calculating the estimated reducing component emission amount Redhat from an input data vector xRed shown by the following equation (34). That is, the input parameters of the reducing component emission amount SOM are the lift amount command value Lcmd of the EGR valve, the boost pressure PB, the intake air temperature TI, the exhaust pressure PE, the fuel injection amount Tout, the dividing ratio Rm1, the post injection amount Toutpost, the intake air flow rate GA, and the engine rotational speed NE.

$$xRed=(Lcmd,PB,TI,PE,Tout,Rm1,Toutpost,GA,NE) \quad (34)$$

A weighting coefficient vector CRedi shown by the following equation (35) is stored corresponding to each neuron NRRedi of the reducing component emission amount SOM.

$$Credi=(CRed0i,CRed1i,CRed2i,CRed3i,CRed4i,\\CRed5i,CRed6i,CRed7i,CRed8i,CRed9i) \quad (35)$$

Therefore, the neuron NRRedi is first selected according to the lift amount command value Lcmd and the boost pressure PB. Next, the weighting coefficient vector CRedi of the selected neuron NRRedi is applied to the following equation (36), to calculate the estimated reducing component emission amount Redhat.

$$Redhat = CRed1i \times Lcmd + CRed2i \times PB + CRed3i \times TI + \\ CRed4i \times PE + CRed5i \times Tout + CRed6i \times Rm1 + \\ CRed7i \times Toutpost + CRed8i \times GA + CRed9i \times NE + CRed0i \quad (36)$$

In step S64, it is determined whether or not the NOx reduction mode flag FRedMod is equal to "1". If FRedMod is equal to "0" in step S64, the modifying coefficient Krsm, the estimated NOx emission amount NOxhat, and the correlation parameter a(k) are applied to the following equation (37), to calculate the trapped NOx amount MNOx(k) (step S65).

$$MNOx(k)=MNOx(k-1)+Krsm \times NOxhat/a(k) \quad (37)$$

In step S66, it is determined whether or not the trapped NOx amount MNOx(k) is equal to or greater than a NOx amount determination threshold value MNOxLMT. If the answer to step S66 is affirmative (YES), the NOx reduction mode flag FRedMod is set to "1" (step S67). If the trapped NOx amount MNOx(k) dose not reach the NOx amount determination threshold value MNOxLMT, the process immediately ends.

If the NOx reduction mode flag FRedMod is set to "1", the answer to step S64 becomes affirmative (YES), and the process proceeds to step S68, in which the estimated reducing component emission amount Redhat is applied to the following equation (38), to update the trapped NOx amount MNOx (k) in the decreasing direction.

$$MNOx(k)=MNOx(k-1)-Redhat \quad (38)$$

In step S69, it is determined whether or not the trapped NOx amount MNOx(k) is equal to or less than "0". If the answer to step S69 is affirmative (YES), the NOx reduction mode flag FRedMod is set to "0" (step S70). If the trapped NOx amount MNOx(k) is not equal to "0", the process immediately ends.

By applying the correlation parameter a(k) to the calculation of the trapped NOx amount MNOx(k) (equation (37)), the influence of the characteristic variation or aging of the engine can be eliminated, thereby obtaining an accurate value of the trapped NOx amount MNOx. Consequently, the reduction process of the trapped NOx can be performed at an appropriate timing, and the situation such that the NOx emission amount exceeds the regulation value can be avoided.

In this embodiment, the estimated NOx emission amount NOxhat is calculated using the NOx emission amount SOM, and the estimated reducing component emission amount Redhat indicative of an amount of NOx reduced when performing the NOx reduction process is calculated using the reducing component emission amount SOM. The neural network is able to store nonlinear relationships among the input parameters. Accordingly, an accurate value of the estimated NOx emission amount NOxhat and the estimated reducing component emission amount Redhat can be obtained not only in a steady operating condition but also in a transient operating condition of the engine, and hence the estimated trapped NOx amount MNOx can be calculated accurately. Consequently, the NOx reducing process is performed at an appropriate timing to thereby maintain the NOx emission amount at a low level.

Further, the estimated NOx emission amount NOxhat is corrected by the correlation parameter a(k) and the modifying coefficient Krsm, to calculate the trapped NOx amount MNOx in the lean NOx catalyst 31. Accordingly, the influence of the characteristic variation and aging of the engine (especially the exhaust gas recirculation device) can be eliminated, thereby obtaining an accurate value of the trapped NOx amount MNOx. Consequently, the reduction process of the trapped NOx can be performed at an appropriate timing, and such a situation that the emission amount of NOx exceeds the regulation value can be avoided.

Further, if the correlation parameter a(k) is equal to or less than the determination threshold value AOBDLMT, it is determined that the exhaust gas recirculation device has failed and the warning lamp is turned on. Therefore, the situation where the NOx emission amount exceeds the regulation value can be promptly eliminated.

FIG. 12 shows time charts of an example of the control operation with respect to the reference engine. The time charts respectively show changes in the engine rotational speed NE, the boost pressure PB, the actual exhaust gas recirculation amount EGRact, the estimated exhaust gas recirculation amount EGRhat, the trapped NOx amount MNOx calculated by the above-described equation (37) or (38), an actual trapped NOx amount MNOxact, the NOx reduction mode flag FRedMod, and an amount ENOxDS of NOx discharged to the downstream side of the lean NOx catalyst 31 (hereinafter referred to as "downstream side NOx emission amount"). In FIG. 12(c), the solid line corresponds to the actual exhaust gas recirculation amount EGRact, and the dashed line corresponds to the estimated exhaust gas recirculation amount EGRhat. Further, in FIG. 12(d), the solid line corresponds to the actual trapped NOx amount MNOxact, and the dashed line corresponds to the calculated trapped NOx amount MNOx. It is confirmed that the actual trapped NOx amount MNOxact and the calculated trapped NOx amount MNOx sustantially coincide with each other. In this state, the NOx reduction process is performed at an appropriate timing, and the downstream side NOx emission amount ENOxDS is maintained at a low level.

FIG. 13 shows an example of the control operation in which a clogging of the EGR valve has occurred and the correction of the NOx emission amount by the correlation parameter a(k) is not performed. Changes in the engine rotational speed NE and the boost pressure PB, which are not shown in FIG. 13, are respectively the same as those of FIG. 12. As shown in FIG. 13(a), the actual exhaust gas recirculation amount EGRact becomes less than the estimated exhaust gas recirculation amount EGRhat and the start timing of the NOx reduction mode (the timing when FRedMod shown in FIG. 13(c) changes from "0" to "1") delays. Consequently, the downstream side NOx emission amount ENOxDS shown in FIG. 13(d) increases compared with the example shown in FIG. 12.

FIG. 14 shows an example in which the correction of the emission amount of NOx is performed according to the correlation parameter a(k) (equation (37)) in the example of the control operation shown in FIG. 13. The solid line in FIG. 14(b) shows changes in the actual trapped NOx amount MNOxact. The correlation parameter a(k) gradually converges to a value which reflects the present engine state by repeating the control operation (FIG. 14(a)). The corrected NOx emission amount (=Krsm×NOxhat/a(k)) gradually becomes appropriate with the convergence of the correlation parameter a(k) and the start timing of the NOx reduction process gradually becomes appropriate as shown in FIG. 14(c). Consequently, the downstream side NOx emission amount ENOxDS gradually decreases as shown in FIG. 14(d).

In this embodiment, the ECU 20 constitutes the trapped NOx amount estimating means and the reducing process means. Specifically, steps S61 to S65 and S68 of FIG. 10 correspond to the trapped NOx amount estimating means, and steps S66, S67, S69, and S70 correspond to the reducing process means.

Second Embodiment

FIG. 15 is a schimatic diagram showing a configuration of an internal combustion engine and a control system therefor according to the present embodiment. In this embodiment, the exhaust gas recirculation amount sensor 26 is not provided, and an air-fuel ratio sensor 30 is provided in the exhaust pipe 4 immediately downstream of the engine 1. The air-fuel ratio sensor 30 detects an air-fuel ratio AF of an air-fuel mixture in the combustion chamber by detecting an oxygen concentration in the exhaust gases, and supplies a detection signal to the ECU 20. The configuration shown in FIG. 15 is the same as that shown in FIG. 1, except for the above-described point.

In this embodiment, a state determination of the exhaust gas recirculation control and/or the boost pressure control is performed using the EGR amount SOM, without using the exhaust gas recirculation amount sensor. A distance parameter Discave is calculated as a parameter indicative of the determined control state, and the NOx emission amount, which is applied to calculating the amount of NOx trapped in the lean NOx catalyst, is calculated according to the distance parameter Discave. Further, the failure determination is performed based on the distance parameter Discave.

Further in this embodiment, a self-organizing map (hereinafter referred to as "first failure EGR amount SOM") for calculating the estimated exhaust gas recirculation amount corresponding to a state where a failure has occurred in the exhaust gas recirculation device (for example, a clogging of the EGR valve), and a self-organizing map (hereinafter referred to as "second failure EGR amount SOM") for calculating the estimated exhaust gas recirculation amount corresponding to a state where a failure has occurred in the intake air flow rate sensor 21 (for example, a failure that an error of the detected value exceeds a predetermined value) are previously set, and the failure determination is performed using these SOMs. Specifically, a first and a second failure distance parameters Diseave and Disaave are calculated using the first and the second failure EGR amount SOMs. The failure determinations of the exhaust gas recirculation device and the intake air flow rate sensor 21 are performed according to the first and the second failure distance parameters Diseave and Disaave. The present embodiment is the same as the first embodiment except for the points described below.

FIGS. 16 and 17 show a flowchart of the fuel injection control process in this embodiment. In step S111, an Lcmdbs map shown in FIG. 18(a) is retrieved according to the engine rotational speed NE and the engine load target value Pmecmd, to calculate an EGR valve lift amount basic command value Lcmdbs. The Lcmdbs map is set similarly to the Lcmd map shown in FIG. 5(a).

In step S112, the same process as step S42 of FIG. 4 is performed, to calculate the target boost pressure PBcmd. In step S113, a Kcmd map shown in FIG. 18(b) is retrieved according to the engine rotational speed NE and the engine load target value Pmecmd, to calculate a target equivalent ratio Kcmd. The target equivalent ratio Kcmd is obtained by coverting a target air-fuel ratio AFcmd to an equivalent ratio. According to the Kcmd map, the target equivalent ratio Kcmd is basically set so as to increase as the engine load target value Pmecmd increases. That is, the target equivalent ratio Kcmd is set to a comparatively small value in the low-load engine operating region in order to improve the fuel consumption. In the medium-speed and medium-load engine operating region, the target equivalent ratio Kcmd is set to a greater value than the value corresponding to a high load operation wherein the engine load target value Pmecmd is equal to the high load value Pmecmd3, since the exhaust gas recirculation amount is set to a comparatively large value.

In step S114, the same process as step S43 of FIG. 4 is performed, to calculate the fuel injection amount Tout. In step S115, the air-fuel ratio AF detected by the air-fuel ratio sensor 30 is converted to the equivalent ratio, to calculate a detected equivalent ratio Kact.

In step S116, the EGR valve lift amount command value Lcmd is calculated with the sliding mode control so that the detected equivalent ratio Kact coincides with the target equivalent ratio Kcmd. Specifically, the EGR valve lift amount command value Lcmd(k) is calculated by adding a sliding mode correction term Lsmc(k) to the basic command value Lcmdbs(k) calculated in step S111 by the following equation (41).

$$Lcmd(k) = Lcmdbs(k) + Lsmc(k) \quad (41)$$

The sliding mode correction term Lsmc(k) is calculated by the following equation (42) as a sum of a reaching law input Lrch(k) and an adaptative law input Ladp(k). The reaching law input Lrch(k) and the adaptative law input Ladp(k) are respectively calculated by the following equations (43) and (44).

[Eq. 3]

$$Lsmc(k) = Lrch(k) + Ladp(k) \quad (42)$$

$$Lrch(k) = KLrch \times \sigma L(k) \quad (43)$$

$$Ladp(k) = KLadp \times \sum_{i=0}^{k} \sigma L(i) \quad (44)$$

In the equations (43) and (44), "σL" is a switching function value calculated by the following equation (45), and "KLrch" and "KLadp" are respectively a reaching law control gain and an adaptative law control gain. In the equation (45), "eaf(k)" is a control deviation calculated by the following equation (46), and "SL" is a switching function setting parameter, which is set to a value between "−1" and "0".

$$\sigma L(k) = eaf(k) + SL \times eaf(k-1) \quad (45)$$

$$eaf(k) = Kact(k) - Kcmd(k) \quad (46)$$

In step S117, the vane opening θvgt(k) of the turbine is calculated with the sliding mode control so that the detected boost pressure PB coincides with the target boost pressure PBcmd. Specifically, the vane opening θvgt(k) is calculated by the following equation (47) as a sum of a reaching law input θrch(k) and an adaptative law input θadp(k). The reaching law input θrch(k) and the adaptative law input θadp(k) are respectively calculated by the following equations (48) and (49).

[Eq. 4]

$$\theta vgt(k) = \theta rcg(k) + \theta adp(k) \quad (47)$$

$$\theta rch(k) = K\theta rch \times \sigma V(k) \quad (48)$$

$$\theta adp(k) = K\theta adp \times \sum_{i=0}^{k} \sigma V(i) \quad (49)$$

In the equations (48) and (49), "σV" is a switching function value calculated by the following equation (50), and "Kθrch" and "Kθadp" are respectively a reaching law control gain and an adaptative law control gain. In the equation (50), "epb(k)" is a control deviation calculated by the following equation (51), and "Sθ" is a switching function setting parameter, which is set to a value between "−1" and "0".

$$\sigma V(k) = epb(k) + S\theta \times epb(k-1) \quad (50)$$

$$epb(k) = PBcmd(k) - PB(k) \quad (51)$$

In step S118, a state determination process of the EGR control and/or the boost pressure control shown in FIG. 19 is performed. The distance parameter Discave, the first failure distance parameter Diseave, and the second failure distance parameter Disaave, which are described above, are calculated. The distance parameter Discave indicates a degree of a deviation of the present control state from the control state of the reference engine. That is, the distance parameter Discave increases as the degree of the deviation increases. Specifically, a larger value of the distance parameter Discave indicates, for example, that the actual exhaust gas recirculation amount EGRact is less than the flow rate corresponding to the reference engine due to a clogging of the EGR valve. Further, the first failure distance parameter Diseave indicates that the present control state is closer to the failed state corresponding to the first failure EGR amount SOM (the state that the exhaust gas recirculation device has failed), as the first failure distance parameter Diseave decreases. The second failure distance parameter Disaave indicates that the present control state is closer to the failed state corresponding to the second failure EGR amount SOM (the state that the intake air flow rate sensor 21 has failed), as the second failure distance parameter Disaave decreases.

In step S119, a state determination process of the lean NOx catalyst shown in FIG. 20 is performed. The process of FIG. 20 is obtained by changing step S65 of FIG. 10 in the first embodiment to step S65a. In step S65a, the distance parameter Discave is applied to the following equation (71) instead of the equation (37), to calculate the trapped NOx amount MNOx.

$$MNOx(k)=MNOx(k-1)+(1+Discave(k))\times Krsm\times Nox\text{-}hat \quad (71)$$

In the equation (71), the second term on the right side which indicates an emission amount of NOx increases as the distance parameter Discave(k) increases. Accordingly, the trapped NOx amount MNOx corresponding to the increase in the actual NOx emission amount is obtained. Therefore, by determining the start timing of the NOx reduction process using the trapped NOx amount MNOx calculated by the equation (71) (steps S66 and S67), the NOx reduction process is started at an appropriate timing, to maintain an amount of NOx discharged to the downstream side of the lean NOx catalyst 31, at a comparatively low level.

Returning to FIG. 16, in step S120, the pilot injection amount Toup is calculated like step S46 of FIG. 4. In step S121, the dividing raito Rmi is calculated like step S47 of FIG. 4.

In steps S122 and S123, the first main injection amount Toutm1(k) and the second main injection amount Toutm2 are calculated like steps S48 and S49.

In step S124 of FIG. 17, it is determined whether or not the reduction mode flag FRedMod is equal to "1". If the answer to step S124 is affirmative (YES), the post injection amount Toutpost is calculated like step S51 of FIG. 4 in the first embodiment (step S125). That is, in the NOx reduction process, the post injection IPOST is performed and the reducing components are supplied to the exhaust system. After execution of step S125, the process proceeds to step S131. If the answer to step S124 is negative (NO), the process immdiately proceeds to step S131.

In step S131, it is determined whether or not the distance parameter Discave(k) is greater than a first failure determination threshold value DISOBDLMT. If the answer to step S131 is negative (NO), it is determined that the engine is normal, and the process immediately ends.

If Discave is greater than DISOBDLMT in step S131, it is determined that any failure has occurred, and it is further determined whether or not the first failure distance parameter Diseave(k) is greater than a second failure determination threshold value DISOBDLMTE (step S132). If the answer to step S132 is negative (NO), it is determined that the exhaust gas recirculation device has failed, and the warning lamp indicative of the failure is turned on (step S133).

If Diseave(k) is greater than DISOBDLMTE in step S132, it is further determined whether or not the second distance parameter Disaave is greater than a third failure determination threshold value DISOBDLMTA (step S134). If the answer to step S94 is negative (NO), it is determined that the intake air flow rate sensor 21 has failed, and the warning lamp indicative of the failure is turned on (step S135).

If Disaave(k) is greater than DISOBDLMTA in step S134, it is determined that any device mounted on the engine 1 other than the exhaust gas recirculation device and the intake air flow rate sensor 21 has failed, and the warning lamp indicative of the failure is turned on (step S136).

FIG. 19 is a flowchart of a process for performing the state determination of the EGR control and/or the boost pressure control. This process is performed in step S118 of FIG. 16.

In step S101, the EGR valve lift amount command value Lcmd(k) and the detected boost pressure PB(k) are applied to the following equation (61), to calculate a two-dimensional distance Disci(k) with respect to all neurons of the EGR amount SOM. In the equation (61), "Lcmdci" and "PBci" are coordinates of the i-th neuron NRi (i=1 to M) on the two-dimensional plane shown in FIG. 2.

[Eq. 5]

$$Disci(k)=\sqrt{(Lcmdci-Lcmd(k))^2+(PBci-PB(k))^2} \quad (61)$$

In step S102, a minimum value Discmin(k) of the two-dimensional distances Disci(k) which are calculated with respect to the "M" neurons, is calculated by the following equation (62).

$$Discmin(k)=\min(Disc1(k), Disc2(k),\ldots, DiscM(k)) \quad (62)$$

In step S103, a moving averaging calculation of the minimum value Discmin(k) (the number of data: Nave+1) is performed by the following equation (63), to calculate the distance parameter Discave(k).

[Eq. 6]

$$Discave(k) = \frac{1}{Nave+1} \sum_{j=0}^{Nave} Discmin(k-j) \quad (63)$$

The distance parameter Discave incicates a deviation amount DEVREF of the present state of the EGR control and/or the boost pressure control from the control state with respect to the reference engine. That is, the distance parameter Discave takes a value substantially equal to "0" if the present control state is the same as the control state with respect to the reference engine. Therefore, the distance parameter Discave increases as the deviation amount DEVREF increases due to the characteristic variation or aging of the engine. Consequently, if the distance parameter Discave is greater than the first failure determination threshold value DISOBDLMT, it is possible to determine that any abnormality exists in the prsent control state, i.e., any one of the devices mounted on the engine 1 has failed (FIG. 17, step S131).

In step S104, a calculation similar to that of step S101 is performed using the first failure EGR amount SOM described above, and a two-dimensional distance Disei(k) is calculated by the following equation (64) with respect to all neurons of the first failure EGR amount SOM. In the equation (64), "Lcmdei" and "PBei" are coordinates of the i-th neuron (i=1 to M) of the first failure EGR amount SOM, on the two-dimensional plane defined by Lcmd and PB.

[Eq. 7]

$$Disei(k)=\sqrt{(Lcmci-Lcmcd(k))^2+(PBei-PB(k))^2} \quad (64)$$

In step S105, a minimum value Disemin(k) of the calculated two-dimensional distances Disei(k) with respect to the "M" neurons, is calculated by the following equation (65).

$$Disemin(k)=\min(Dise1(k), Dise2(k),\ldots, DiseM(k)) \quad (65)$$

In step S106, a moving averaging calculation of the minimum value Disemin(k) is performed by the following equation (66), to calculate the first failure distance parameter Diseave(k).

$$Diseave(k) = \frac{1}{Nave+1} \sum_{j=0}^{Nave} Disemin(k-j) \quad (66)$$

The first failure distance parameter Diseave indicates a deviation amount DEVFL1 of the present state of the EGR control and/or the boost pressure control from the control state corresponding to the first failure EGR amount SOM. That is, if the present control state is the same as the control state corresponding to the first failure EGR amount SOM, the first failure distance parameter Diseave is substantially equal to "0". The first failure distance parameter Diseave increases as the deviation amount DEVFL1 increases. Consequently, if the first failure distance parameter Diseave is equal to or less than the second failure determination threshold value DISOBDLMTE, it is possible to determine that the exhaust gas recirculation device has failed (FIG. 17, steps S132, S133).

In step S107, a calculation similar to that of step S101 is performed using the second failure EGR amount SOM described above, and a two-dimensional distance Disai(k) is calculated by the following equation (67) with respect to all neurons of the second failure EGR amount SOM. In the following equation (67), "Lcmdai" and "PBai" in the equation (67) are coordinates of the i-th neuron (i=1 to M) of the second failure EGR amount SOM, on the two-dimensional plane defined by Lcmd and PB.

[Eq. 9]

$$Disai(k) = \sqrt{(Lcmdai - Lcmd(k))^2 + (PBai - PB(k))^2} \quad (67)$$

In step S108, a minimum value Disamin(k) of the two-dimensional distances Disai(k) with respect to the "M" neurons, is calculated by the following equation (68).

$$Disamin(k) = \min(Disa1(k), Disa2(k), \ldots, DisaM(k)) \quad (68)$$

In step S109, a moving averaging operation of the minimum value Disamin(k) is performed by the following equation (69), to calculate the second failure distance parameter Disaave(k).

[Eq. 10]

$$Disaave(k) = \frac{1}{Nave + 1} \sum_{j=0}^{Nave} Disamin(k - j) \quad (69)$$

The second failure distance parameter Disaave indicates a deviation amount DEVFL2 of the present state of the EGR control and/or the boost pressure control from the control state corresponding to the second failure EGR amount SOM. That is, if the present control state is the same as the control state corresponding to the second failure EGR amount SOM, the second failure distance parameter Disaave is substantially equal to "0". The second failure distance parameter Diseave increases as the deviation amount DEVFL2 increases. Consequently, if the second failure distance parameter Diseave is equal to or less than the third failure determination threshold value DISOBDLMTA, it is possible to determine that the intake air flow rate sensor 21 has failed (FIG. 17, steps S134, S135).

As described above, in this embodiment, the failure determination is performed by comparing the distance parameter Discave, the failure distance parameters Diseave and Disaave with the failure determination threshold values. Therefore, it is possible to determine a failure of the devices mounted on the engine 1 without any special sensor for determining the failure.

By previously setting the first failure EGR amount SOM corresponding to the state in which the exhaust gas recirculation device has failed, and the second failure EGR amount SOM corresponding to the state in which the intake air flow rate sensor 21 has failed, and performing the failure determination by the first and second failure distance parameters Diseave and Disaave calculated using these failure SOMs, a failure of the exhaust gas recirculation device or the intake air flow rate sensor can be determined.

FIG. 21 shows time charts of an example of the control operation with respect to the reference engine. These time charts respectively show changes in the engine rotational speed NE, the target boost pressure PBcmd, the boost pressure PB, the EGR valve lift amount basic command value Lcmdbs, the EGR valve lift amount command value Lcmd, the trapped NOx amount MNOx calculated by the equation (71) or (38), the actual trapped NOx amount MNOxact, the NOx reduction mode flag FRedMod, and the downstream side NOx emission amount ENOxDS. In FIG. 21(b), the solid line corresponds to the detected boost pressure PB, and the dashed line corresponds to the target boost pressure PBcmd. The two lines substantially coincide with each other. In FIG. 21(c), the solid line corresponds to the lift amount command value Lcmd, and the dashed line corresponds to the lift amount basic command value Lcmdbs. The two lines substantially coincide with each other. Further, in FIG. 21(d), the solid line corresponds to the actual trapped NOx amount MNOxact, and the dashed line corresponds to the calculated trapped NOx amount MNOx. The actual trapped NOx amount MNOxact and the calculated trapped NOx amount MNOx substantially coincide with each other. In this state, the NOx reduction process is performed at an appropriate timing, thereby maintaining the downstream NOx emission amount ENOxDS at a comparatively low level.

FIG. 22 shows an example of the control operation in which a clogging of the EGR valve has occurred and the correction of the emission amount of NOx by the distance parameter Discave is not performed. Changes in the engine rotational speed NE, which are not shown in FIG. 22, is the same as that of FIG. 21. As shown in FIG. 22(a), a difference between the target boost pressure PBcmd and the detected boost pressure PB gradually increases, and a difference between the lift amount basic command value Lcmdbs and the lift amount command value Lcmd also gradually increases as shown in FIG. 22(b). This is because the two feedback controls (steps S116 and S117) are operating to compensate the influence of reduction in the actual exhaust gas recirculation amount EGRact. Therefore, as shown in FIG. 22(c), the actual trapped NOx amount MNOxact becomes greater than the calculated trapped NOx amount MNOx shown by the dashed line. Consequently, as shown in FIG. 22(d), the start timing of the NOx reduction process (timing at which FRedMod changes from "0" to "1") delays, and the downstream NOx emission amount ENOxDS increases immediately before the start of the NOx reduction process (FIG. 22(e)).

FIG. 23 shows an example of the control operation in which the NOx emission amount is corrected according to the distance parameter Discave(k) (equation (71)) in the example shown in FIG. 22. The solid line of FIG. 23(b) shows changes in the actual trapped NOx amount MNOxact. The distance parameter Discave(k) gradually converges to a value which reflects the present engine state by repeating the control operation (FIG. 23(a)). The corrected NOx emission amount (=(1+Discave(k))×Krsm×NOxhat) becomes appropriate along with the convergence of the distance parameter Discave (k), and the start timing of the NOx reduction process gradually becomes appropriate as shown in FIG. 23(c). Consequently, the downstream side NOx emission amount ENOxDS gradually decreases as shown in FIG. 23(d).

As described above, in the present embodiment, the estimated NOx emission amount NOxhat is calculated using the NOx emission amount SOM, and the estimated NOx emission amount Noxhat is corrected by the distance parameter Discave(k) and the modifying coefficient Krsm, to calculate the trapped NOx amount MNOx of the lean NOx catalyst 31. Accordinglly, the influence of the characteristic variation or aging of the engine (especially the exhaust gas recirculation device) can be eliminated, thereby obtaining an accurate value of the trapped NOx amount MNOx. Consequently, it is possible to perform the reduction process of the trapped NOx at an appropriate timing, and such a situation that the emission amount of NOx exceeds the regulation value can be avoided.

In this embodiment, Steps S61 to S65a and S68 of FIG. 20 correspond to the trapped NOx amount estimating means, and steps S66, S67, S69, and S70 correspond to the reducing process means.

The present invention is not limited to the embodiments described above, and various modifications may be made. For example, in the first embodiment, not only the self-organizing map but also what is known as the so-called perceptron, as shown in FIGS. 24 and 25, are applicable as the neural network.

The neural network shown in FIG. 24 is configured for calculating the estimated exhaust gas recirculation amount EGRhat. This neural network has a three-layer structure of an input layer, an intermediate layer, and an output layer, and further includes delay blocks 101 to 107 for delaying the input data by one sampling period. The well-known back-propagation learning algorithm is adopted as a learning algorithm. It is to be noted that other methods, such as the random search method, may be adopted as the learning algorithm.

The parameters which are input to the neurons of the input layer are the input parameters of the EGR amount SOM described above, i.e., the lift amount command value Lcmd, the boost pressure PB, the exhaust pressure PE, the intake air temperature TI, the fuel injection amount Tout, the intake air flow rate GA, the engine rotational speed NE, and the preceding values of these parameters (except for the intake air temperature TI) detected one sampling period before, and the preceding value of the estimated exhaust gas recirculation amount EGRhat which is the output parameter of the neural network calculated one sampling period before.

If the input parameter is expressed by Ui (i=1 to Ni), each input parameter Ui is weighted by a coupling coefficient matrix, and the weighted input parameters (Wij·Ui) are input to each neuron of the intermediate layer. An output Xj(k) (j=1 to Nj) of the intermediate layer is given by the following equation (81). In the equation (81), "Wij" is a coupling coefficient; "W0" is an additional term; and "F" is an input/output function to which, for example, a sigmoid function or a radial basis function and the like are applied.

[Eq. 11]

$$Xj(k) = F\left(\sum_{i=0}^{Ni} Wij \cdot Ui(k) + W0\right) \quad (81)$$

In the output layer, if an output parameter is expressed by Y(k), the output parameter Y(k) is given by the following equation (82). In this equation, "Rj" is a coupling coefficient and "R0" is an additional term.

[Eq. 12]

$$Y(k) = \sum_{j=0}^{Nj} Rj \cdot Xj(k) + R0 \quad (82)$$

The coupling coefficients Wij and Rj, and the additional terms W0 and R0 in the equations (81) and (82) are previously calculated with a predetermined learning algorithm using input data for the learning, and stored in the memory. The engine on which the setting of the neural network is based is the reference engine of the average characteristic like the EGR amount SOM described above.

An estimation accuracy in the transient state can be improved by adopting the preceding values of the engine operating parameters and the preceding value of the output parameter, as the input parameters. In the configuration shown in FIG. 24, the data detected one sampling period before are used as the input parameters. Alternatively, the data detected two sampling periods before, and/or the data detected three sampling periods before may further be used.

The neural network shown in FIG. 25 is configured for calculating the estimated NOx emission amount NOxhat, and has the same structure as that of the neural network shown in FIG. 24. It is to be noted that the dividing ratio Rm1 of the main injection is added as an input parameter. The estimated NOx emission amount NOxhat can be calculated using the equations similar to the equations (81) and (82).

The neural network for calculating the estimated reducing component emission amount Redhat can be similarly configured by adding the post injection amount Toutpost as an input parameter to the neural network shown in FIG. 25.

In the above described embodient, both of the estimated NOx emission amount NOxhat and the estimated reducing component emission amount Redhat are calculated using a neural network. Alternatively, any one of NOxhat and Redhat may calculated using a neural network.

Industrial Applicability

The present invention can be applied to an exhaust gas purifying apparatus for an gasoline internal combustion engine in addition to the diesel internal combustion engine described above. The present invention can be applied also to an exhaust gas purifying apparatus for a watercraft propulsion engine, such as an outboard engine having a vertically extending crankshaft.

The invention claimed is:

1. An exhaust gas purifying apparatus for an internal combustion engine having a lean NOx catalyst in an exhaust system, said lean NOx catalyst trapping NOx in exhaust gases when the exhaust gases are in an oxidizing state, and discharging the trapped NOx when the exhaust gases are in an reducing state, said exhaust gas purifying apparatus comprising:

trapped NOx amount estimating means for calculating an estimated trapped NOx amount which is an estimated value of an amount of NOx trapped in the lean NOx catalyst using a neural network to which engine operating parameters indicative of an operating condition of said engine are input, wherein said neural network outputs at least one control parameter which is relevant to said lean NOx catalyst; and reducing process means for performing a reducing process of the NOx trapped in said lean NOx catalyst, according to the estimated trapped NOx amount.

* * * * *